United States Patent [19]
Arnold

[11] Patent Number: 5,535,378
[45] Date of Patent: Jul. 9, 1996

[54] BALANCED AND STABILIZED QUICKSORT METHOD

[76] Inventor: William D. Arnold, 5459 Hedgerow Dr., Indianapolis, Ind. 46226-1625

[21] Appl. No.: 177,289

[22] Filed: Jan. 4, 1994

[51] Int. Cl.[6] ......................................................... G06F 7/08
[52] U.S. Cl. ........................................................... 395/600
[58] Field of Search ..................................... 395/600, 800

[56] References Cited

U.S. PATENT DOCUMENTS

| | | | |
|---|---|---|---|
| 4,575,798 | 3/1986 | Lindstrom et al. | 364/300 |
| 4,809,158 | 2/1989 | McCauley | 395/600 |
| 4,845,744 | 7/1989 | DeBenedictis | 379/221 |

OTHER PUBLICATIONS

R. Sedgewick, Algorithms, Addison–Wesley Pub. pp. 103–113, 1983.
C. Davidson, "Quicksort Revisited" IEEE Trans Software Engr. vol. 14, NO. 10, pp. 1480–1481, Oct. 1988.
V. Estivill–Castro et al. "An Adaptive Generic Sorting Algorithm that uses Variable Partitioning" Proc. IEEE 1993 Int'l Conf. Computing & Information, pp. 8–12, 1993.
Communications of the ACM, Appendix A–Benchmarks By Rudolph Loser, Mar., 1974, vol. 17, No. 3.
Unix Review, "Software Exploratorium", John Bentley, Aug., 1992 (p. 71 only).
Communications of the ACM, "Some Performance Tests of quicksort and Descendants," Rudolf Loeser, Mar. 1974, vol. 17, No. 3.
Communications of the ACM "A Class of Sorting Algorithms Based on Quicksort", Roger L. Wainwright, Apr., 1985, vol. 28, No. 4.
Communications of the ACM, "Increasing the Efficiency of Quicksort", M. H. van Emden, vol. 13, No. 9, Sep., 1970.
IEEE Transactions on Software Engineering, "Improving Quicksort Performance with a Codeword Data Structure," Jean–Loup Baer and Yi–Bing Lin, vol. 15, No. 5, May 1989.
Communications of the ACM, "Implementing Quicksort Programs", Robert Sedgewick, Oct., 1978, vol. 21, No. 10.

Primary Examiner—Thomas G. Black
Assistant Examiner—Peter Y. Wang
Attorney, Agent, or Firm—Ice Miller Donadio & Ryan; Paul B. Overhauser

[57] ABSTRACT

The improved Quicksort method of the present invention utilizes two pointers initialized at opposite ends of the array or partition to be sorted and an initial partition value Pvalue located at the center of the array or partition. The value at each of the end pointers is then compared to Pvalue. Sorting is accomplished by recursing the partition process for the two array segments bounded on one side by the final P valve location. This method prevents excessive recursions, and allows the identical array case to recurse to the ideal minimum: Log2(N). Also, by relaxing the offsider criteria to include elements equal to Pvalue, the present invention presents arrays of two valves or a very small range of valves from recursing excessively. Further, the sorting method of the present invention may test the final position of the initial Pvalue to determine whether it is in the center (75%–95%) portion of the array or subarray being positioned. If it is not, the first Pvalue is disregarded, and a new initial Pvalue is selected, preferably randomly selected from the larger subarray bounded on one side by the final Pvalue location resulting from the initial attempt. This method prevents arrays situated in "pipe organ" sequence from recursing excessively. In addition, a maximum recursion depth limit may be specified to force section of a new initial Pvalue if a recursion level exceeds the depth limit.

9 Claims, 3 Drawing Sheets

BALANCED AND STABILIZED QUICKSORT METHOD

FIELD OF THE INVENTION

This invention relates to methods for sorting digitally stored information, and, in particular, to methods in accordance with the quicksort sorting method.

BACKGROUND OF THE INVENTION

Sorting is one of the most frequently conducted functions in data processing. Accordingly, providing sorting methods that work faster and with greater reliability are very important. These considerations are particularly important when sorting an array which is too large to be stored in a computer's random access memory.

Most programmers utilize the generic sorting utility supplied as part of their compiler library. For the C compiler, this is usually "Qsort." Virtually all C compiler Qsorts are direct descendants of the original AT&T UNIX system version written at Bell Labs circa 1978. This "Qsort" is very closely related to QuickerSort (ACM algorithm number 271) and not it's namesake, Qsort (ACM algorithm number 402).

The generic Qsort method is also related to the familiar binary search where each recursion halves the scope of the search. This relationship is most visible in the primary component of Qsort—the partition algorithm. It's job is to split a given array into exactly two pieces. To do this, it arbitrarily chooses an element as the partition value (Pvalue) and then considers the array from both ends to (ideally) the middle. Partition() looks for elements less than Pvalue on the high side and elements greater than Pvalue on the low side. When it has one of each, it swaps them and continues bringing the twin array indexes together. Where the indexes meet is where the Pvalue belongs, +/− one. After a final swap including Pvalue, Partition() is done. The partition(ed) array has three very important properties:

1) Pvalue is in it's FINAL position and can be further ignored.

2) All remaining elements are on their proper side or equal to Pvalue.

3) Partition can be called to further operate on either sub-array.

C.A.R. Hoare published the original "divide and conquer" "*QuickSort*" in July of 1961 as ACM algorithm number 64. This is the accepted root of any "Qsort," and is where the partition and recurse concept originated. Hoare selected his partition value randomly at all times. As discussed below, this penalizes the user when the array begins nearly sorted. In particular, Hoare scanned his arrays with a pointer starting from one end and continuing until an out of place value was found. After the first offsider was found, another pointer was scanned in from the opposite end until an offsider, or the first pointer, was hit. This scanning method is fraught with danger.

R. S. Scowen published his modification to the original algorithm and called it "QuickerSort" in November of 1965 as ACM#271. Scowen selected his partition value at the center of the sub-array. This is ideal for nearly sorted arrays and reverse sorted arrays but less than desirable for merging equal-length sorted blocks. Scowen also optimized the partition routine for the special case of two elements. Last, but not least, Scowen reduced the maximum depth of the stack by recursing into to the smaller partition first. Since the process was totally predictable, the "pipe organ" case (described further below) was reverse engineered to consistently present the worst possible partition value in the center. QuickerSort is also susceptible to the identical and 1's and 0's problems (described further below).

There was one other major attempt at modifying Quick-Sort by van Emden, M. H. in "Increasing the Efficiency of Quicksort," Communications of the ACM, Vol. 13, No. 9 (Sept. 1970). This article explains the mean partition value concept where the average value of the array is used for partitioning. It is believed that drawbacks of this approach include records that do not hash down to a neat value and the fact that an array element cannot be removed from consideration at each recursion level. The improvements alleged have not been reproducible and probably triggered the benchmark series by Rudolph Loeser in March of 1974.

The article "Implementing Quicksort Programs," Sedgewick, Robert, Communications of the ACM, Vol. 21, No. 10 (October 1978), concerns itself with machine efficiency rather than algorithm efficiency. It does note that "One can always 'work backwards' to find a file which will require time proportional to $N^2$ to sort."

Sibley, Edgar H., "A Class of Sorting Algorithms Based on Quicksort," Communications of the ACM, Vol. 28, No.4 (April 1985), modifies Qsort to do a single partition. After each swap, the outermost parts of the array are bubble sorted to ensure that they remain in order until the indexes meet. It is believed that this method is inefficient because it does not partition efficiently, and this reference pertains more to bubble sorts than quickersorts.

Baer, Jean-Loup, "Improving Quicksort Performance with a Codeword Data Structure," IEEE Transactions on Software Engineering, Vol. 15 No. 5 (May 1989), concentrates on hashing records down to keys that can be sorted in memory. Conceptually, this is a case of sorting an index rather than a full record array. Each key can constitute a higher level —multi-record—view. Once the author explains his codeword key hash method, the article reverts to a very in-depth look at mechanical optimization techniques.

The shortcoming of past Qsort methods stems from the realization that all of Qsort's benefits accrue from partitioning the array as evenly as possible. Anytime the partition attempts consistently to converge away from the center of the array by a considerable margin, the Qsort will be less efficient. Therefore, a primary concern of the present invention is to maintain partition balance. Further investigation into MS-Qsort (and other implementations) reveals that the twin indexes are not brought together in lock-step. In other words, a single index is sequenced until it locates an offsider before the other index is even considered. This is the QuickerSort methodology. These shortcomings are particularly noticeable when an array happens to consist of identical elements. The twins meet each other at one end or the other and the array is partitioned into two subarrays, one of which is only one entry smaller than the original. Thus, this condition recurses $N/2-2$ times rather than the $Log2(N)$ times QuickerSort is theoretically capable of achieving.

Most known Qsorts suffer from performance degradation under three conditions: (1) when all array elements are the same or; (2) when all array elements are of only two values (e.g. 1's and 0's); and (3) "pipe organ" inputs like 12344321. The pipe organ array breaks down because neither the first, last or center elements are an adequate choice for Pvalue. Although similar in effect to that of the identical elements condition, the pipe organ case requires a totally different sorting strategy. Most, if not all, commercial Qsorts are vulnerable to the pipe organ situation.

OBJECTS OF THE INVENTION

Accordingly, an object of the invention is to provide a Quicksort method that operates efficiently on a variety of types of arrays, including random, sorted, nearly sorted, reverse sorted, those containing many identical values or only a small range of values, and organ pipe organ situated data.

SUMMARY OF THE INVENTION

Figure 1:
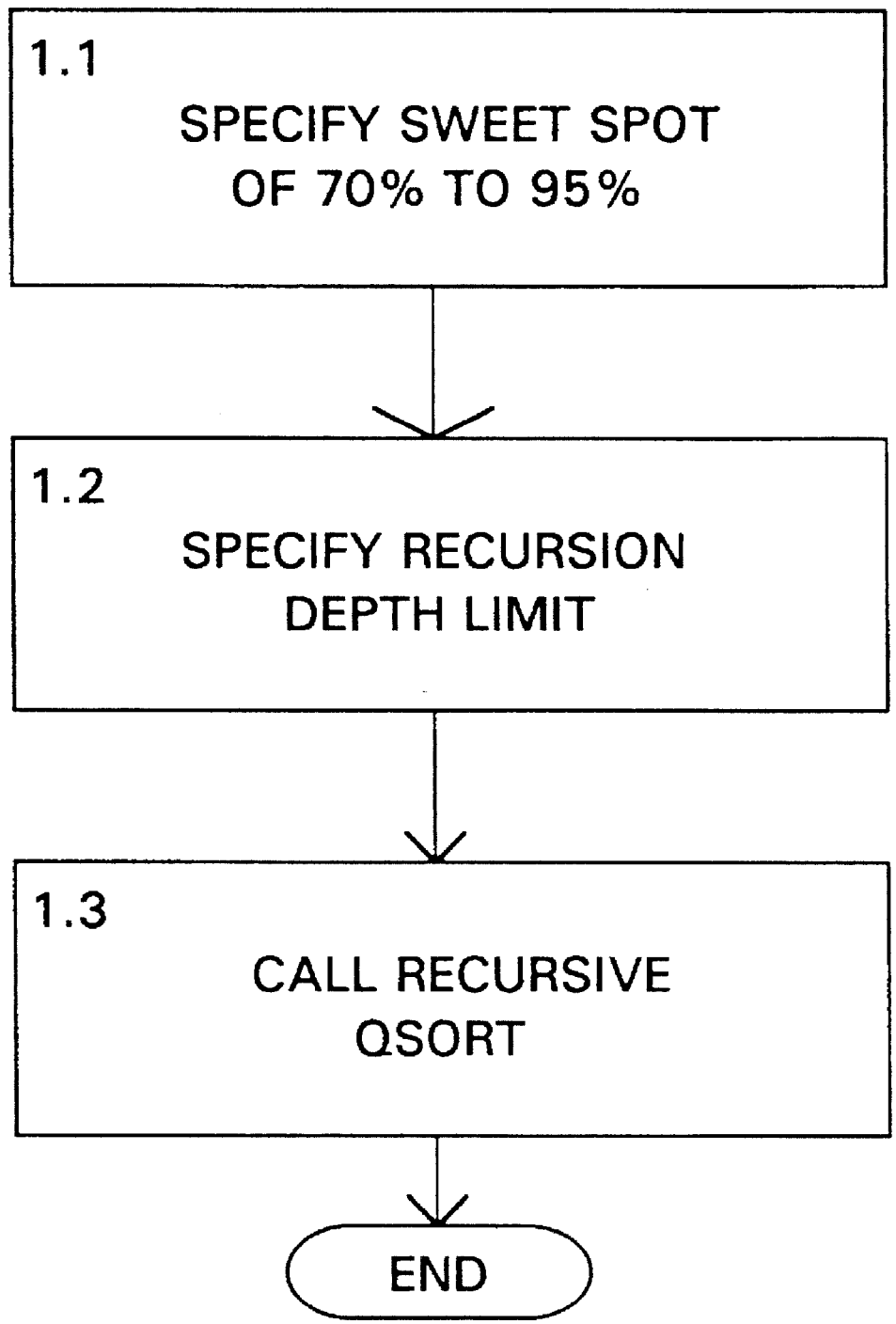
FIG. 1 is a flow chart showing the method for calling the recursive Q sort method according to the present invention.
Figure 2:
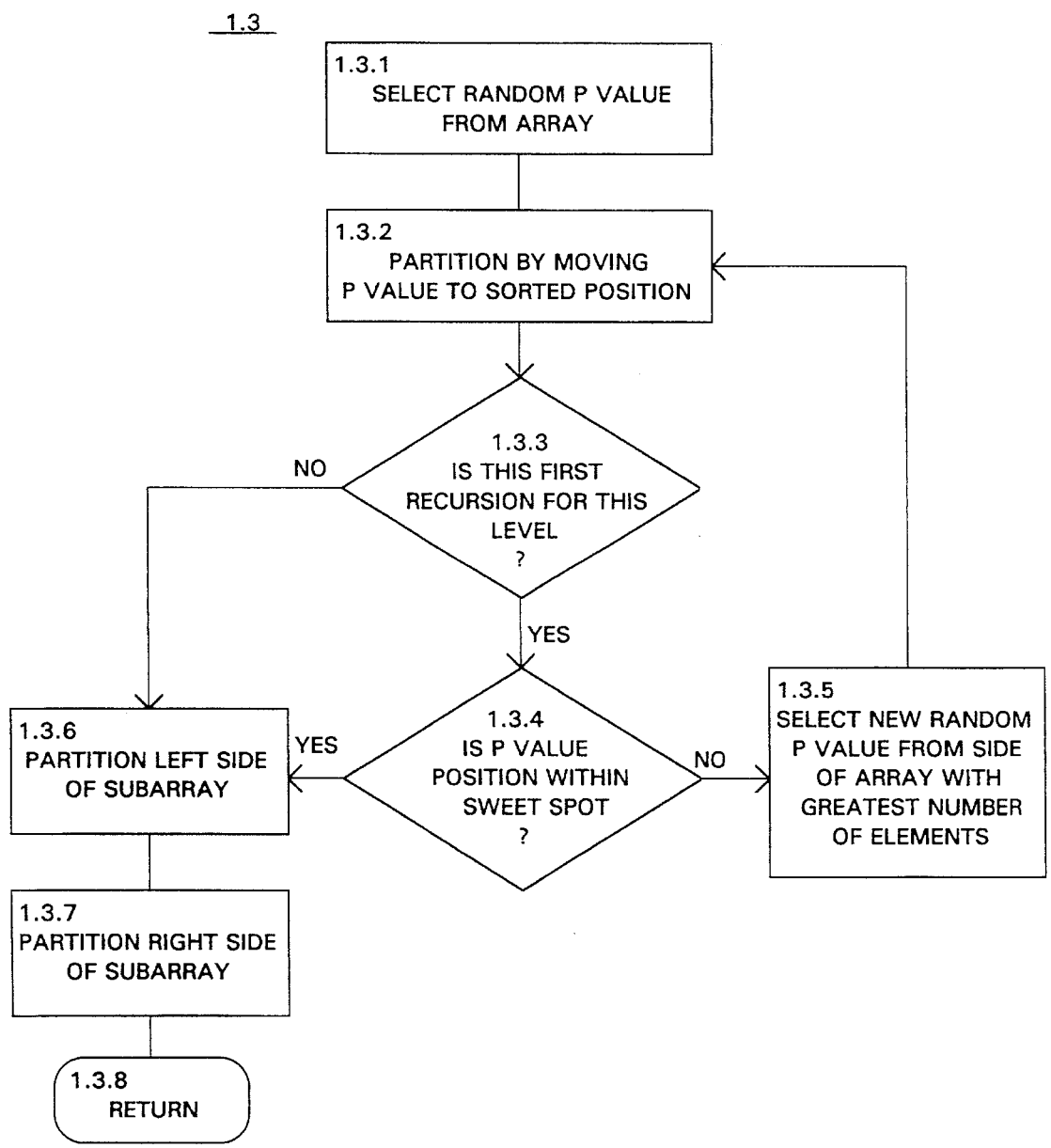
FIG. 2 is a flow chart showing one embodiment of the Q sort method according to the present invention.
Figure 3:
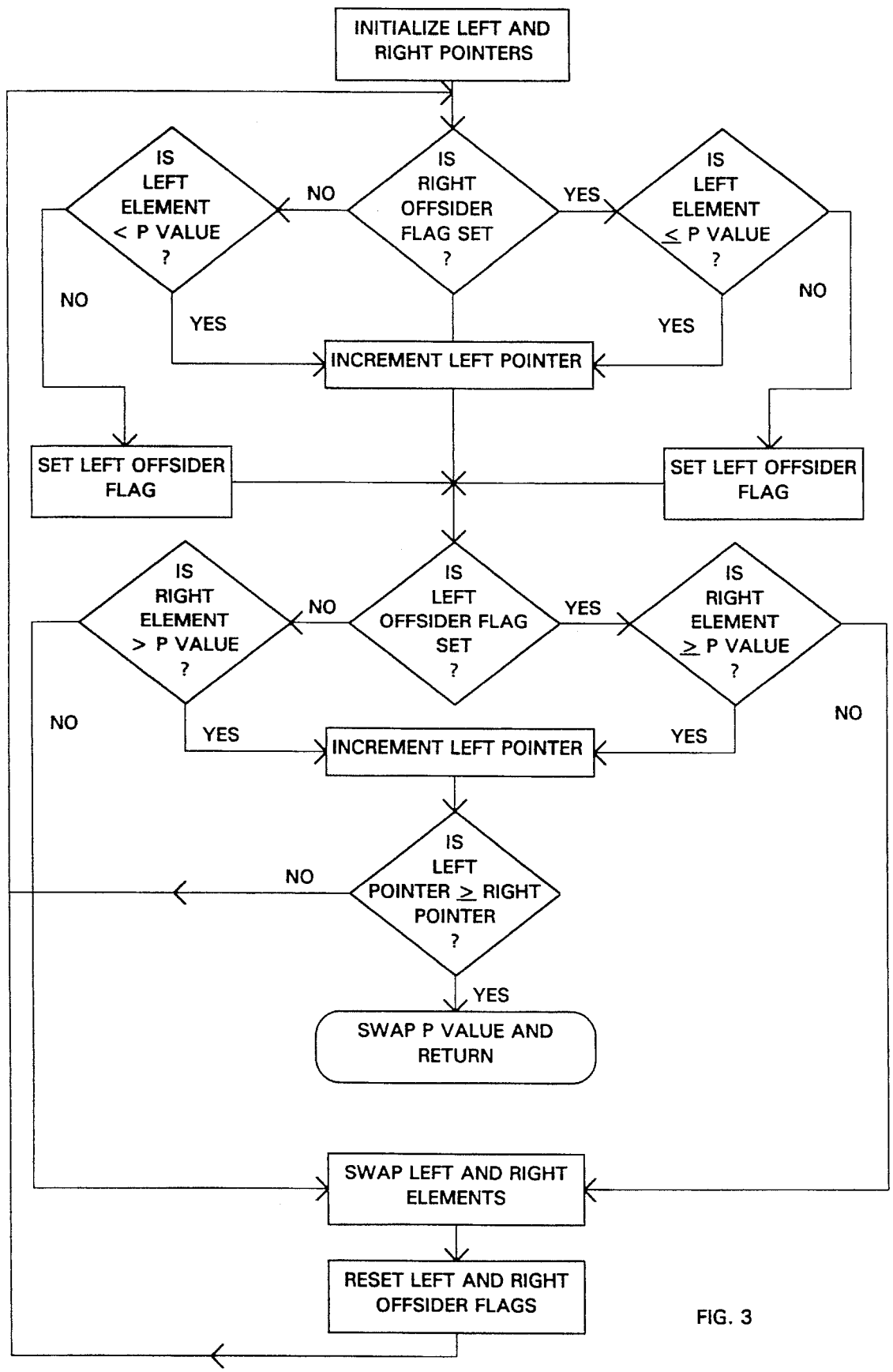
FIG. 3 is a flow chart of the partitioning method of step 1.3.2 of FIG. 2.

The improved Quicksort method of the present invention utilizes two pointers initialized at opposite ends of the array or partition to be sorted. After each comparison, each pointer is synchronously moved toward each other if the compared elements are both on the proper side of the Pvalue. If only one element is on the proper side of the Pvalue, then the values are not swapped, but the movement of the pointer to the element on the opposite side of the Pvalue is suspended. The pointer to the element on the correct side of Pvalue continues to move toward the opposite pointer until it too encounters an element on the incorrect side of, or equal to, the Pvalue. At this point, the two elements are swapped. The comparison (and movement of both pointers) then resumes as discussed above until the pointers converge. The Pvalue is then relocated to this point to conclude the partition process. Sorting is accomplished by recursing this partition process for the two array segments bounded on one side by the final Pvalue location. This method prevents excessive recursions, and allows the identical array case to recurse to the ideal minimum: Log2(N). Also, by relaxing the offsider criteria to include elements equal to Pvalue, the present invention prevents arrays of two values or a very small range of values from recursing excessively. Further, the sorting method of the present invention may test the final position of the initial Pvalue to determine whether it is in the center (75%–95%) portion of the array or subarray being partitioned. If it is not, the first Pvalue is disregarded, and a new initial Pvalue is selected, preferably randomly selected from the larger subarray bounded on one side by the discarded Pvalue location resulting from the initial attempt. This method prevents arrays situated in a "pipe organ" sequence from recursing excessively. In addition, a maximum recursion depth limit may be specified to force section of a new initial Pvalue if a recursion level exceeds the depth limit.

DETAILED DESCRIPTION

The improved Quicksort method of the present invention utilizes two pointers initialized at opposite ends of the array or partition to be sorted. After each comparison, each pointer is synchronously moved toward each other if the compared elements are both on the proper side of the Pvalue. If only one element is on the proper side of the Pvalue, then the values are not swapped, but the movement of the pointer to the element on the opposite side of the Pvalue is suspended. The pointer to the element on the correct side of Pvalue continues to move toward the opposite pointer until it too encounters an element on the incorrect side of, or equal to, the Pvalue. At this point, the two elements are swapped. The comparison (and movement of both pointers) then resumes as discussed above until the pointers converge. The Pvalue is then relocated to this point to conclude the partition process. Sorting is accomplished by recursing this partition process for the two array segments bounded on one side by the final Pvalue location. This method prevents excessive recursions by increasing the likelihood that it will converge in the middle, and allows the identical array case to recurse to the ideal minimum: Log2(N). Further, for each partition, the sorting method of the present invention may test the final position of the initial Pvalue to determine whether it is in the center (75%–95%) portion of the array or subarray being sorted. If it is not, the first Pvalue is disregarded, and a new initial Pvalue is selected, preferably randomly selected from the larger subarray bounded on one side by the Pvalue location resulting from the initial attempt. This method prevents arrays situated in "pipe organ" sequence from recursing excessively. In addition, a maximum recursion depth limit may be specified to abandon the current process and to start over with a more cautious configuration where the following attempt is significantly less likely to recurse as deep since the array has already been partially sorted and because of the increased caution.

This solution solves the problem where the array is filled with identical values and where the array is filled with a small number of unique values (e.g. 0,1). Note that the out-of-place criteria excludes the equal case initially but relaxes to include it after the first out-of-place member of a swappable pair has been located. This might seem to unnecessarily increase the number of swaps, but it also increases the likelihood that the partitioning concludes near the middle of the array. Testing shows the 0's & 1's case now typically recursing to 1.3 Log2(N), as shown below.

The following test results show results on three classes of arrays: random, 1's & 0's, and identical. The following tests were averaged from 21 trials, specifically N= 100, 141, 200, 316, 500, 707, 1000, 1414, 2000, 3162, 5000, 7071, 10000, 14140, 20000, 31620, 50000, 70710, 100000, 141400, 200000.

|  | Case→ | | | | | |
| --- | --- | --- | --- | --- | --- | --- |
|  | Random | | 1's & 0's | | Identical | |
|  | Comps | Recurs | Comps | Recurs | Comps | Recurs |
| Max | 1.2130 | 2.8000 | 0.8954 | 1.4286 | 0.8910 | 1.0000 |
| Avg | 1.1233 | 2.3832 | 0.8390 | 1.2473 | 0.8281 | 1.0000 |
| Sdev | 0.0683 | 0.1983 | 0.0488 | 0.0916 | 0.0502 | 0.0000 |

Comps is the ratio of actual comparisons to Ideal: N * Log2(N)
Recurs is ratio of act recursions to Ideal: floor (Log2(N/2))
Note that Log2(N) is calculated by Ln(N)/Ln(2).

The identical case proves that the ideal recursion is attainable, as long as no swapping is required. The 1's & 0's case has excellent performance, and averages only 25% more difficultly recursing than the ideal minimum. The random case averages 138% more difficult than the ideal minimum, but never exceeds 180% (2.8 * ideal) in this small sample. Note that the ratio of actual comparisons to the "ideal" N * Log2(N), the test beats the given ideal in both the identical and the 1's and 0's case.

N * Log2(N) does not consider the removal of partition values from the sorting process. There are 2^(depth) partition values per recursion level, with each Pvalue corresponding to a sub-array and call to partition(). But the critical fact is that none of these arrays include the Pvalues from the previous levels. Thus, each recursion cuts the array by more than half. Specifically (N−1)/2; where N is the size of the array to partition. For example, the first level has N elements, the second level has (2*(N−1))/2 elements, the third (4*((N−1)/2)−1)/2. Picture this as placing more and more ignorable spaces in the original array space:

| | |
|---|---|
| 0: --------------------P-------------------- | 1 array tot 40 elem |
| 1: ---------P---------- ----------P---------- | 2 arrays tot 39 elem |
| 2: ----P---- ----P---- ----P---- ----P----- | 4 arrays tot 37 elem |
| 3: -P-- -P-- -P-- -P-- -P-- -P-- -P-- --P-- | 8 arrays tot 33 elem |
| 4: - P- - P- - P- - P- - P- - P- - P- P- P- | 16 arrays tot 25 elem |

A 40 element array can be reduced to 16 smaller 1 or 2 element arrays with only 4 recursions. Although one could continue to use Qsort all the way down to 2 elements, in one embodiment of the present invention, the method sorts two and three element arrays in special routines designed to take maximum advantage of the array in buffer situation. As shown below, 36% to 50% of the calls to the present invention's Qsort partition are directed to these two special routines.

A review of the number of comparisons needed to partition all the arrays at a given depth level reveals that the first level has N−1 mandatory comparisons. The second level lost one element and needs ((N−1)/2)−1 per sub-array, or N−3 total. This can also be stated as N minus the number of P's & Spaces on a level in the above diagram. The sequence is: 1, 3, 7 . . . (2^(depth+1)−1). Therefore, the total number of comparisons can be expressed as:

$$\text{Sigma}(d = 0 \ldots D, (N + 1) - 2 (d + 1)) \{d = \text{depth}, D = \text{max\_depth}\}$$
$$\text{or, Sigma}(d = 0 \ldots D, (N + 1)) - \text{Sigma}(d = 0 \ldots D, 2 (d + 1))$$
$$\text{or, } (N + 1) * (D + 1) - (2 (D + 2) - 2) \{\text{solving the Sigma's}\}$$

Noting that the ideal level count is equal to both max_depth+1 and Log2(N), therefore, D can be replaced by with Log2(N)−1:

$$\text{comps}=(N+1) * \text{Log2}(N)-(2^{(\text{Log2}(N)+1)}-2)$$

Note that 2^(Log2(N)+1) can be further reduced to N * 2. Collecting terms and reducing, the result is:

$$\text{comps}=(N+1)*\text{Log2}(N)-(N-1)*2.$$

As N gets large; (N+1) and (N−1) converge to simply N. Thus, the equation above converges to:

$$\text{comps}=N*(\text{Log2}(N)-2) \text{ OR } N* \text{Log2}(N/4)$$

As is evident from the identical case study above, this is approximately 83% of the classic N Log2(N) for a range.

Additional tests used the 21 different arrays sized from 100 to 200,000 elements, but the arrays were initialized with random data limited to a specific modulus. These tests expanded the 1's & 0's concept to research how the amount of work undertaken relates to the baseline ideals. These tests assume that the improved method of the present invention must expend a basic amount of energy just to consider the array (the ideal minimum) and anything over that is a function of the quantity of unique elements and their randomness. Since it's extremely difficult to judge "randomness", the following study only varies the uniqueness; on array initialization, elem=rand() % Modulus.

| Modulus | Recursion Max | Ratio Avg | Summary Sdev | Comparison Max | Ratio Avg | Summary Sdev |
|---|---|---|---|---|---|---|
| 1 | 1.0000 | 1.0000 | 0.0000 | 1.0336 | 1.0090 | 0.0080 |
| 2 | 1.4000 | 1.2703 | 0.0700 | 1.0932 | 1.0258 | 0.0191 |
| 4 | 1.6250 | 1.3565 | 0.1135 | 1.1239 | 1.0566 | 0.0287 |
| 8 | 1.8000 | 1.4527 | 0.1442 | 1.2813 | 1.0860 | 0.0534 |
| 16 | 1.8000 | 1.4977 | 0.1167 | 1.2877 | 1.1146 | 0.0520 |
| 32 | 2.2000 | 1.6792 | 0.1975 | 1.3911 | 1.1677 | 0.0746 |
| 64 | 2.3333 | 1.7549 | 0.2127 | 1.3581 | 1.1807 | 0.0575 |
| 128 | 2.6000 | 1.8495 | 0.2506 | 1.7162 | 1.2490 | 0.1400 |
| 256 | 2.5000 | 2.0048 | 0.2657 | 1.5181 | 1.2804 | 0.1072 |
| 512 | 3.2500 | 2.0936 | 0.3725 | 1.8445 | 1.3146 | 0.1745 |
| 1024 | 2.8000 | 2.1506 | 0.2722 | 1.6193 | 1.3090 | 0.1041 |
| 2048 | 2.5385 | 2.1876 | 0.1634 | 1.4923 | 1.3189 | 0.0694 |
| 4096 | 2.9000 | 2.3234 | 0.2677 | 1.5450 | 1.3801 | 0.1045 |
| 8192 | 2.8333 | 2.3913 | 0.2027 | 1.5929 | 1.3801 | 0.0717 |
| 16384 | 2.8571 | 2.3750 | 0.2428 | 1.5077 | 1.3844 | 0.0678 |
| 32768 | 3.1667 | 2.3339 | 0.2670 | 1.7913 | 1.3531 | 0.1051 |

These ratios are well-behaved both from a Standard Deviation perspective and a trend basis. Note how slow baseline ideals grow in relation to element uniqueness. When the standard deviation is expressed as a percent, it remains fairly constant at 10.8% of recursions and 6.5% of comparisons. This suggests the following predicted averages:

$$\text{Avg\_recurs}=\text{Baseline\_Ideal} * (1+\text{Ln}(\text{Modulus})/6.062)$$

$$\text{Avg\_comps}=\text{Baseline\_Ideal} * (1+\text{Ln}(\text{Modulus})/23.04)$$

Another embodiment of the present invention helps to solve arrays sorted in "pipe organ" fashion, such as "12344321." This embodiment involves arbitrarily creating a target area or "sweet-spot" in the center of the array. If a partition converges in the sweet-spot then nothing changes from before. But if not, the array is repartitioned with a new partition value based on what is learned from the first attempt. In one embodiment, the second partition is final. One object of this embodiment is to maintain partition balance. Bad partitions will always leave a large majority of the array on one side. In such instances, one of the only facts known about the partitioned array is that all of the elements on the small side are just as bad or worse than the initial Pvalue. Therefore, the next partition value is selected from the bigger side.

However, the size of the "sweet spot" is an important factor. Empirical research reveals that correct selection of a sweet spot brings the pipe-organ case down to a very reasonable 1.82 times the baseline comparisons ideal. Recursions are very reasonable too, seldom more than 2 times baseline.

| Elem | comps | ratio_I, | Recur, | ratio_I |
|---|---|---|---|---|
| 1000, | 14431, | 1.8116, | 12, | 1.6250, pipe organ case |
| 5000, | 93137, | 1.8106, | 15, | 1.4545, pipe organ case |
| 10000, | 205657, | 1.8220, | 17, | 1.5000, pipe organ case |
| 65000, | 1658790, | 1.8244, | 28, | 2.0714, pipe organ case |

Good results were also achieved for randomly sorted arrays, as shown by the following table averaging several tests of the specified array size for sweet spots of 75%, 87.5%, and 93.75%. These sweet spot sizes imply that arrays must be a minimum size before the non-sweet spots are at least an element wide. {This minimum is in braces} All the numbers in the following table are the comparisons ratio to ideal followed by the standard deviation therewith, as a percent, in parenthesis:

Sorts of 30 Bit RANDOM number arrays with various size sweet spots

| Elem | Trys | NO Sweet Spot | 75% {8 elem} | 87.5% {16 elem} | 93.75% {32 elem} |
|---|---|---|---|---|---|
| 2048 | 12 | 1.3938 (6.0%) | 1.4715 (5.0%) | 1.4144 (4.0%) | 1.4000 (8.0%) |
| 8192 | 6 | 1.3927 (3.4%) | 1.4670 (4.0%) | 1.4642 (2.3%) | 1.4213 (6.8%) |
| 32768 | 6 | 1.3949 (2.7%) | 1.4760 (4.2%) | 1.4433 (3.4%) | 1.3872 (5.2%) |
| 131072 | 6 | 1.3724 (3.2%) | 1.4869 (3.2%) | 1.4401 (1.6%) | 1.4091 (6.2%) |
| 524288 | 6 | 1.3767 (2.4%) | 1.4652 (3.1%) | 1.3927 (0.9%) | 1.4127 (5.3%) |
| 2097152 | 3 | 1.3841 (2.0%) | 1.4382 (1.7%) | 1.3976 (1.7%) | 1.3979 (1.2%) |
| 8388608 | 3 | 1.4020 (1.4%) | 1.4649 (2.5%) | 1.4144 (1.0%) | 1.3905 (1.4%) |
| 33554432 | 3 | 1.4028 (1.6%) | 1.5250 (3.3%) | 1.4252 (1.2%) | 1.4505 (3.7%) |
| Average: |  | 1.3899 (0.8%) | 1.4743 (1.6%) | 1.4240 (1.6%) | 1.4087 (1.4%) |
| Pct Chg: |  | 0.00% | 6.07% | 2.45% | 1.35% |
| Pipe Organ Comps Ratio avg: |  |  | 1.82 | 1.91 | 1.93 |
| Pipe Organ Recur Ratio max: |  |  | 2.1 | 3.2 | 4.5 |

The above shows that randomized arrays require 1.39 times the baseline ideal amount of comparisons without repartitioning. When a 75 % sweet spot is used, randomized arrays require 6.07% more comparisons than before but only grow to 1.82 times the baseline for the pipe organ, showing an improvement over using no sweet spot. An 87.5% sweet spot implies 2.45% and 1.91 times the baseline, respectively. This shows that by selecting different sweet spots, pipe organ stability is traded off for an increased amount of comparisons on the typical random case. As noted above, a pipe organ tries to recurse to N/2–2 without sweet spot repartitioning. A slightly different way to view this is as wasting the difference between N/2–2 and the archetypical 2.4 * Log2(N/4) for a fully random order:

| Spot Size | Nmin | N/2 − 2 | 2.4 * Log2(N/4) | Difference |
|---|---|---|---|---|
| 75.0% | 8 | 2.0 | 2.4 | −0.4 |
| 87.5% | 16 | 6.0 | 4.8 | 1.2 |
| 93.75% | 32 | 14.0 | 7.2 | 6.8 |
| 96.875% | 64 | 30.0 | 9.6 | 20.4 |
| 98.4375 | 128 | 62.0 | 12.0 | 50.0 |
| 99.21875 | 256 | 126.0 | 14.4 | 111.6 |

The above table suggests that 6.8 recursion levels can be incurred before policing the partition balance with a 93.75% sweet spot size. As noted above, this translates to an increase in comparisons of only 1.35% over doing no repartitioning at all. As the pipe organ cases discussed below confirm, the method of one embodiment of the present invention can recurse up to four times the baseline minimum in a worst case scenario, even though the (much more common) random case only recurses 2.4 times the baseline. Nevertheless, Log2(N) performance is achieved. Applications that need to sort more than a hundred million elements should limit the recursion depth by using the 87.5% sweet spot, as it's worst case limit is 2.5 billion elements.

In another embodiment of the present invention, the method will "gracefully" stop recursing once it reaches a preset RECURSION_LIMIT value. After it backs out of the sort in progress without corrupting anything, it simply re-starts the sort with the sweet spot reduced to 75%. It is practically guaranteed not to recurse as deep since the file was partially sorted on the first attempt. However, this feature should not ordinarily be implemented to routinely stretch the practical working limit of one billion elements except in a pure pipe organ situation.

In summary, a 93.75% sweet spot implies that the repartitioning test cannot fail for subarrays of less than 32 elements. Although pipe organ arrays can run poorly up to that point, they will be sternly repartitioned thereafter. As the following table shows, all ratios seem to stabilize by the time the organ gets up to 64 elements in size. After that, they average 1.93 times the baseline comparisons and 2.77 times the baseline recursions. This stability comes at a price though, as a random array comparison performance rises from 1.39 to 1.41 times the baseline. A summary of the pipe organ's performance is as follows:

| 93.75% Sweet Spot { Nmin = 32 } Sorts of PIPE ORGAN type arrays | | | | | | | | |
|---|---|---|---|---|---|---|---|---|
| N | Cnt | Comps | Part_3+ | RePart | Part_3 | Part_2 | Rec | Ratio_I | Time |
| 8 | 1 | 2.3750 | 37.500 | 0.000 | 12.500 | 0.000 | 2 | 2.0000 | (N/A) |
| 10 | 1 | 2.1938 | 40.000 | 0.000 | 0.000 | 20.000 | 3 | 3.0000 | (N/A) |
| 12 | 1 | 2.2608 | 41.667 | 0.000 | 8.333 | 8.333 | 4 | 4.0000 | (N/A) |
| 14 | 1 | 2.1737 | 42.857 | 0.000 | 7.143 | 7.143 | 5 | 5.0000 | (N/A) |
| 16 | 1 | 2.2812 | 50.000 | 0.000 | 0.000 | 12.500 | 7 | 3.5000 | (N/A) |
| 18 | 1 | 2.3298 | 44.444 | 0.000 | 5.556 | 5.556 | 7 | 3.5000 | (N/A) |
| 20 | 1 | 2.3257 | 40.000 | 0.000 | 10.000 | 5.000 | 7 | 3.5000 | (N/A) |
| 22 | 1 | 2.3287 | 45.455 | 0.000 | 4.546 | 9.091 | 8 | 4.0000 | (N/A) |

-continued

| 93.75% Sweet Spot { Nmin = 32 } Sorts of PIPE ORGAN type arrays | | | | | | | | | |
|---|---|---|---|---|---|---|---|---|---|
| N | Cnt | Comps | Part_3+ | RePart | Part_3 | Part_2 | Rec | Ratio_I | Time |
| 24 | 1 | 2.3211 | 37.500 | 0.000 | 12.500 | 4.167 | 7 | 3.5000 | (N/A) |
| 26 | 1 | 2.3216 | 38.462 | 0.000 | 11.538 | 3.846 | 8 | 4.0000 | (N/A) |
| 28 | 1 | 2.3535 | 35.714 | 0.000 | 14.288 | 3.571 | 8 | 4.0000 | (N/A) |
| 30 | 1 | 2.3737 | 40.000 | 0.000 | 10.000 | 6.667 | 9 | 4.5000 | (N/A) |
| 32 | 1 | 2.4063 | 40.625 | 0.000 | 9.375 | 6.250 | 10 | 3.3333 | (N/A) |
| 40 | 1 | 2.0997 | 40.000 | 2.500 | 10.000 | 5.000 | 10 | 3.3333 | (N/A) |
| 64 | 1 | 1.8320 | 39.063 | 3.125 | 7.812 | 10.938 | 8 | 2.0000 | (N/A) |
| 128 | 1 | 1.8359 | 39.844 | 1.563 | 9.375 | 8.594 | 11 | 2.2000 | (N/A) |
| 512 | 1 | 1.9277 | 38.477 | 2.344 | 9.180 | 8.789 | 21 | 3.0000 | 144.7387 |
| 2048 | 1 | 1.8613 | 40.430 | 1.709 | 8.008 | 8.691 | 21 | 2.3333 | 87.4432 |
| 8192 | 1 | 2.0195 | 40.503 | 1.733 | 8.423 | 8.179 | 27 | 2.4545 | 71.4345 |
| 32768 | 1 | 1.9224 | 40.451 | 1.932 | 8.130 | 8.600 | 37 | 2.8462 | 70.8265 |
| 131072 | 1 | 1.9734 | 40.337 | 1.818 | 8.237 | 8.561 | 48 | 3.2000 | 71.9098 |
| 524288 | 1 | 1.9703 | 40.222 | 1.805 | 8.301 | 8.579 | 50 | 2.9412 | 90.2555 |
| 2097152 | 1 | 1.9187 | 40.233 | 1.790 | 8.336 | 8.502 | 58 | 3.0526 | 107.7008 |
| 8388608 | 1 | 2.0215 | 40.247 | 1.802 | 8.332 | 8.504 | 78 | 3.7143 | 64.153 |
| Average: | | 1.9283 | 39.981 | 1.962 | 8.413 | 8.794 | | 2.7742 | 70.846 |
| Std Dev: | | 0.0657 | 0.6434 | 0.433 | 0.466 | 0.730 | | 0.4952 | 41.899 |
| | | Comps | Part_3+ | RePart | Part_3 | Part_2 | | Ratio_I | Time |

(All averages were calculated from 64 element arrays and larger.)

Where:

N is the elemental size of the array.

Cnt is the number of trial runs in line averages.

Comps is the ratio of Comparisons to ideal: N * Log2(N/4). {The next four columns are expressed as a percent of N}

Part_3 + is the number of calls to partition for sub-arrays>3 elem.

Re-Part is the number of re-partitions due to missed sweet-spots.

Part_3 is the number of calls to partition/sort 3 elem sub-arrays.

Part_2 is the number of calls to partition/sort 2 elem sub_arrays.

Rec is the average recursion depth for the given array size.

Ratio_I is the recursion depth relative to ideal: floor(Log2(N/4)).

Time is the sorting time divided by actual comparisons; MicroSeconds.

In analyzing the above results, it is important to keep in mind that they are based on the most difficult array type for a quicksort to handle. Note that the 93.75% sweet spot allows recursions to grow as N/2–2 up to the 32 element police kick-in point. Sometimes, the optimized twosort() and threesort() saves a recursion. Nevertheless all the ratios are relatively stable when 64 or more elements are sorted. Each ratio parameter is discussed individually after the next table.

The sorting method of the present invention expends a baseline amount of energy just to consider a given array. Ideally, if the array is already in order, this is the only energy expended. If only a small percentage of the elements are out of order, the energy rises a small percentage. It is interesting to note how the initial order affects the energy. Reverse sorted arrays require only the baseline amount of comparisons. 30 bit random number arrays require 1.4 times the baseline minimum comparisons. Sorting pipe organ ordered arrays can require up to 2.1 times the baseline comparisons. This demonstrates that the pipe organ case is very nearly the worst possible order for a Quicksort method, and fortunately occurs somewhat rarely in real life. It is possible to use the pipe organ case to predict a worst case rise above baseline within a three sigma (99.865%) confidence interval as follows.

Max Comparisons=2.13 * Baseline, Max Recursions=4.5 * Baseline

Typ Comparisons=1.41 * Baseline, Typ Recursions=2.40 * Baseline

Min Comparisons=1.00 * Baseline, Min Recursions=1.00 * Baseline

Comps. Baseline=N * Log2(N/4), Recur Baseline=floor(Log2(N/4))

The random performance is shown below.

| 93.75% Sweet Spot {Nmin = 32} Sorts of 30 bit RANDOM number arrays | | | | | | | | | |
|---|---|---|---|---|---|---|---|---|---|
| N | Cnt | Comps | Part_3+ | RePart | Part_3 | Part_2 | Rec | Ratio_I | Time |
| 2048 | 13 | 1.4000 | 39.953 | 0.477 | 10.145 | 9.826 | 19.6 | 2.1795 | 241.192 |
| 8192 | 13 | 1.4213 | 39.822 | 0.433 | 10.095 | 10.027 | 26.3 | 2.3916 | 213.053 |
| 32768 | 13 | 1.3872 | 39.765 | 0.447 | 10.096 | 10.057 | 30.4 | 2.3373 | 212.778 |
| 131072 | 13 | 1.4091 | 39.799 | 0.431 | 10.043 | 10.096 | 36.2 | 2.4154 | 218.641 |
| 524288 | 7 | 1.4127 | 39.789 | 0.441 | 10.045 | 10.094 | 41.4 | 2.4370 | 225.552 |
| 2097152 | 3 | 1.3979 | 39.793 | 0.434 | 10.041 | 10.102 | 46.3 | 2.4386 | 237.156 |
| 8388608 | 3 | 1.3905 | 39.798 | 0.435 | 10.045 | 10.089 | 52.0 | 2.4762 | 250.466 |
| 33554432 | 3 | 1.4505 | 39.782 | 0.435 | 10.039 | 10.109 | 58.3 | 2.5362 | 84.877 |
| Average: | | 1.4087 | 39.813 | 0.442 | 10.069 | 10.050 | N/A | 2.4015 | 210.464 |
| Std Dev: | | 0.0191 | 0.055 | 0.014 | 0.037 | 0.089 | N/A | 0.1000 | 49.162 |

(The parameters have exactly the same meaning as they did above.)

It is first worth noting that the maximum depth reached past 50 recursions for the largest array of 33,554,432 elements and, that the average recursion of 2.4 times the ideal. Assuming an absolute worst case ratio of 4, up to 92 recursions could occur for the largest array above. Nevertheless, a 100 recursion limit should perform adequately for any situation.

In addition to the number of comparisons and recursions, another factor of interest is the number of times that partition(), threesort(), & twosort() are called. The number of calls thereto can be neatly expressed as a percentage of N. Ideally, partition() would be called 25%N times and split another 25%N between twosort() and threesort(). It's notable here, that partition() is being called at 39.8%N and 20.1%N is going nearly equally between twosort() and threesort(). The latter two routines being optimized partition/sort methods for the smallest sub-arrays of length two and three, respectively. Also, note that repartitioning occurs only 0.44%N times. Compared to the 39.8%N calls it is evident that repartitioning 1.1% of the sub-arrays occurs for sub-arrays greater than 3 elements in size. But, this can rise to 1.96/39.98 or 4.9% to control the pipe organ case. Accordingly, repartitioning does not help efficiency in the random case, but merely guarantees stability.

Although several authors postulate that the traditional quicksort is inefficient for "small" arrays of 9 elements or less (e.g., "Implementing Quicksort Programs by Robert Sedgewick of Brown University), the quicksort method of the present invention does not demonstrate such shortcomings except those accumulated from calculating the median index value (the sweet spot test may be skipped for n<32) and not taking advantage of the sub-array in buffer condition. Inefficiencies of prior quicksort methods likely accrue from not dropping the partition value from consideration on recursions. Because ⅓ to ½ of the total recursive calls are sub-arrays where n<4, optimization efforts are worth the extra effort.

Although the above discussion focuses on the number of comparisons and recursion levels, the issue of sorting time is also worth discussing. The above tests tracked the number of seconds required to perform the sort, not including the time required to initialize the array or verify sort correctness. Knowing that 90% or more of the time is spent loading and comparing records, the total time can be divided by the actual number of comparisons made. This microsecond value is displayed in the rightmost column of the above study and is a composite of three 286-class machines working full time on a LAN. The last value in said column was made using a 50 Mhz 486 to speed up the heavy end of the study. Regardless, the way to predict the sorting time is to perform a small sort of say, 32768 elements and note the time; 212.8 micro-seconds in this case. Then, calculate any time estimate from 212.8E-6 * 1.4 * N * Log2(N/4).

In summary, the basic Qsort can be stabilized by relaxing the offsider criteria and allowing partition() a second chance when it misses the sweet spot. The worst case "pipe organ" scenario succumbs to 1.9 times ideal, up only slightly from 1.4 times ideal for the completely random case.

To provide another benchmark between the method of the present invention and those of the prior art, it is noted that Rudolph Loeser, in "Some Performance Tests of QuickSort and Descendants," Communications of the ACM, Vol. 17, No. 3 (March 1974), published benchmark tests for his quicksort method. These results derived that the optimum number of comparisons is N*Log2(N) (although the above results derived that the optimum number of comparisons is N*Log2(N/4) for the present invention). Accordingly, a set of benchmark results of present method against those published by Loeser, for various types of array sorts is shown below. Table I is for the present invention (called WdaSort) configured with a 93.75% sweet spot. The columns are:

N—The size of the array being sorted.

M—The number of array elements out of place in almost sorted order, and the number of equal-length blocks in the merge blocks order.

Cnt—The number of WdaTest2 program runs underlying the line averages.

Comps_W—The ratio of the number of comparisons to the ideal calculated by the inventor: N * Log2(N/4). This value has been included for discussion purposes in lieu of the Loeser ratio because it is very stable among initial (pre-sort) orders.

Sd—The standard deviation of the column immediately to the left of the value, expressed as a percent. This parameter is calculated for several columns.

Comps_L—The ratio of the number of comparisons to N * Log2(N). This ratio is sometimes expressed as the asymptotic limit when N→∞, but it has been shown that N * Log2(N/4) converges faster.

Fetch_L—The ratio of the number of record fetches to N * Log2(N). (Rudolph Loeser compares everything by this basis)

Save_L—The ratio of the number of record saves to N*Log2(N).

Part4+—The number of calls to initially partition sub-arrays of length four or greater, expressed as a percentage of N (rather than Loeser's ratio) so that some basic properties of WdaSort are more apparent. This has no direct correlation to Loeser's study.

RePart—The number of times that the initial partitions had to be re-done because they balanced outside of the sweet spot. Although this is also a call to partition a sub-array of length four or greater, it is counted independently of the preceding column. It is expressed as a percentage of N.

Sort3—The number of calls to sort out a three element sub-array, expressed as a percent of N.

Sort2—The number of calls to sort out a two element sub-array, expressed as a percent of N.

Rec—The maximum number of recursive WdaSort calls.

Ratio_W—The ratio of the recursive calls to the ideal calculated by Wda: Log2(N/4). This value has been included for discussion purposes in lieu of the Loeser ratio because it is very stable among initial (pre-sort) orders. Loeser's recursion ratio can not be directly compared because it is based on N*Log2(N).

Time—This value was obtained by dividing the total sorting time by the number of comparisons made. It is expressed in Micro-Seconds and represents the time required for a 386/25 PC to load a record over the LAN and compare it to the partition element. The consistency of this value demonstrates the real time predictability of WdaSort as a function: Total_Time=Time * Comps_W * N * Log2(N/4).

All sorting algorithms are affected by the array's initial order. Loeser benchmarked with five different cases; Already Sorted, Sorted in Reverse order, Random order, Almost sorted order, and equal-length (or merge) block order.

TABLE I

WdaSort operating with a 93.75% Sweet Spot { Nmin = 32 }

Sorted Order

| N | M | Cnt | Comps_W | Sd | Comps_L | Sd | Fetch_L | Save_L | Sd | Part4+ | RePart | Sort3 | Sort2 | Rec | Ratio_W | Time |
|---|---|---|---|---|---|---|---|---|---|---|---|---|---|---|---|---|
| 32 | 1 | 1.0729 | 1.4674 | 10.9% | 0.7438 | 10.9% | 0.0000 | 25.000 | 10.2% | 0.000 | 0.000 | 21.875 | 3.125 | 3.0 | 1.0000 | 0.000 |
| 128 | 1 | 1.0141 | 1.4170 | 7.7% | 0.7958 | 7.7% | 0.0000 | 25.000 | 7.1% | 0.000 | 0.000 | 24.219 | 0.781 | 5.0 | 1.0000 | 0.000 |
| 512 | 1 | 1.0031 | 1.3981 | 4.2% | 0.8357 | 4.2% | 0.0000 | 25.000 | 3.9% | 0.000 | 0.000 | 24.805 | 0.195 | 7.0 | 1.0000 | 0.000 |
| 2048 | 1 | 1.0007 | 1.4065 | 6.4% | 0.8642 | 6.4% | 0.0000 | 25.000 | 6.1% | 0.000 | 0.000 | 24.951 | 0.049 | 9.0 | 1.0000 | 0.000 |
| 8192 | 1 | 1.0002 | 1.4163 | 4.1% | 0.8848 | 4.1% | 0.0000 | 25.000 | 3.9% | 0.000 | 0.000 | 24.988 | 0.012 | 11.0 | 1.0000 | 33.286 |
| 32768 | 1 | 1.0000 | 1.4325 | 2.2% | 0.9000 | 2.2% | 0.0000 | 25.000 | 2.1% | 0.000 | 0.000 | 24.997 | 0.003 | 13.0 | 1.0000 | 32.864 |
| 131072 | 1 | 1.0000 | 1.3666 | 1.8% | 0.9118 | 1.8% | 0.0000 | 25.000 | 1.8% | 0.000 | 0.000 | 24.999 | 0.001 | 15.0 | 1.0000 | 45.267 |
| 524288 | 1 | 1.0000 | 1.3820 | 2.4% | 0.9211 | 2.4% | 0.0000 | 25.000 | 2.3% | 0.000 | 0.000 | 25.000 | 0.000 | 17.0 | 1.0000 | 43.645 |
| 2097152 | 1 | 1.0000 | 1.3667 | 2.5% | 0.9286 | 2.5% | 0.0000 | 25.000 | 2.4% | 0.000 | 0.000 | 25.000 | 0.000 | 19.0 | 1.0000 | 62.014 |
| 8388608 | 1 | 1.0000 | 1.4194 | 1.0% | 0.9348 | 1.0% | 0.0000 | 25.000 | 1.0% | 0.000 | 0.000 | 25.000 | 0.000 | 21.0 | 1.0000 | 83.577 |
| 33554432 | 1 | 1.0000 | 1.4028 | 1.2% | 0.9400 | 1.2% | 0.0000 | 25.000 | 1.1% | 0.000 | 0.000 | 25.000 | 0.000 | 23.0 | 1.0000 | 69.815 |

Reverse Order

| N | M | Cnt | Comps_W | Sd | Comps_L | Sd | Fetch_L | Save_L | Sd | Part4+ | RePart | Sort3 | Sort2 | Rec | Ratio_W | Time |
|---|---|---|---|---|---|---|---|---|---|---|---|---|---|---|---|---|
| 32 | 1 | 1.0729 | 0.6438 | 10.9% | 0.7438 | 10.9% | 0.2000 | 25.000 | 10.2% | 0.000 | 0.000 | 21.875 | 3.125 | 3.0 | 1.0000 | 0.000 |
| 128 | 1 | 1.0141 | 0.7243 | 7.7% | 0.7958 | 7.7% | 0.1429 | 25.000 | 7.1% | 0.000 | 0.000 | 24.219 | 0.781 | 5.0 | 1.0000 | 0.000 |
| 512 | 1 | 1.0031 | 0.7802 | 4.2% | 0.8357 | 4.2% | 0.1111 | 25.000 | 3.9% | 0.000 | 0.000 | 24.805 | 0.195 | 7.0 | 1.0000 | 0.000 |
| 2048 | 1 | 1.0007 | 0.8188 | 6.4% | 0.8642 | 6.4% | 0.0909 | 25.000 | 6.1% | 0.000 | 0.000 | 24.951 | 0.049 | 9.0 | 1.0000 | 54.215 |
| 8192 | 1 | 1.0002 | 0.8463 | 4.1% | 0.8848 | 4.1% | 0.0769 | 25.000 | 3.9% | 0.000 | 0.000 | 24.988 | 0.012 | 11.0 | 1.0000 | 33.286 |
| 32768 | 1 | 1.0000 | 0.8667 | 2.2% | 0.9000 | 2.2% | 0.0667 | 25.000 | 2.1% | 0.000 | 0.000 | 24.997 | 0.003 | 13.0 | 1.0000 | 35.211 |
| 131072 | 1 | 1.0000 | 0.8824 | 1.8% | 0.9118 | 1.8% | 0.0588 | 25.000 | 1.8% | 0.000 | 0.000 | 24.999 | 0.001 | 15.0 | 1.0000 | 44.759 |
| 524288 | 1 | 1.0000 | 0.8947 | 2.4% | 0.9211 | 2.4% | 0.0526 | 25.000 | 2.3% | 0.000 | 0.000 | 25.000 | 0.000 | 17.0 | 1.0000 | 42.523 |
| 2097152 | 1 | 1.0000 | 0.9048 | 2.5% | 0.9286 | 2.5% | 0.0476 | 25.000 | 2.4% | 0.000 | 0.000 | 25.000 | 0.000 | 19.0 | 1.0000 | 49.616 |
| 8388608 | 1 | 1.0000 | 0.9130 | 1.0% | 0.9348 | 1.0% | 0.0435 | 25.000 | 1.0% | 0.000 | 0.000 | 25.000 | 0.000 | 21.0 | 1.0000 | 55.614 |
| 33554432 | 1 | 1.0000 | 0.9200 | 1.2% | 0.9400 | 1.2% | 0.0400 | 25.000 | 1.1% | 0.000 | 0.000 | 25.000 | 0.000 | 23.0 | 1.0000 | 59.720 |

Random Order

| N | M | Cnt | Comps_W | Sd | Comps_L | Sd | Fetch_L | Save_L | Sd | Part4+ | RePart | Sort3 | Sort2 | Recur | Ratio_W | Time |
|---|---|---|---|---|---|---|---|---|---|---|---|---|---|---|---|---|
| 32 | 1 | 96 | 1.4674 | 10.9% | 0.8805 | 10.9% | 0.9939 | 0.4398 | 7.7% | 39.030 | 0.000 | 9.928 | 10.514 | 5.9 | 1.9826 | 523.919 |
| 128 | 1 | 48 | 1.4170 | 7.7% | 1.0121 | 7.1% | 1.0955 | 0.4345 | 3.9% | 39.372 | 0.391 | 9.977 | 10.449 | 10.6 | 2.1250 | 46.712 |
| 512 | 1 | 24 | 1.3981 | 4.2% | 1.0874 | 3.9% | 1.1527 | 0.4439 | 2.2% | 39.657 | 0.521 | 10.116 | 9.994 | 15.2 | 2.1667 | 41.301 |
| 2048 | 1 | 12 | 1.4065 | 6.4% | 1.1508 | 6.1% | 1.2040 | 0.4441 | 1.2% | 39.937 | 0.468 | 9.998 | 10.010 | 20.9 | 2.3241 | 41.882 |
| 8192 | 1 | 6 | 1.4163 | 4.1% | 1.1984 | 3.9% | 1.2435 | 0.4486 | 0.8% | 39.732 | 0.462 | 10.179 | 10.010 | 25.8 | 2.3485 | 41.762 |
| 32768 | 1 | 3 | 1.4325 | 2.2% | 1.2415 | 4.1% | 1.2806 | 0.4475 | 1.0% | 39.921 | 0.433 | 10.037 | 10.037 | 31.0 | 2.3846 | 40.960 |
| 131072 | 1 | 3 | 1.3666 | 1.8% | 1.2058 | 2.2% | 1.2403 | 0.4519 | 0.1% | 39.865 | 0.441 | 10.024 | 10.079 | 35.7 | 2.3778 | 44.382 |
| 524288 | 1 | 3 | 1.3820 | 2.4% | 1.2366 | 1.8% | 1.2674 | 0.4543 | 0.4% | 39.774 | 0.436 | 10.084 | 10.066 | 40.7 | 2.3922 | 46.161 |
| 2097152 | 1 | 2 | 1.3667 | 2.5% | 1.2365 | 2.4% | 1.2645 | 0.4563 | 0.4% | 39.774 | 0.439 | 10.048 | 10.104 | 44.5 | 2.3421 | 54.344 |
| 8388608 | 1 | 2 | 1.4194 | 1.0% | 1.2960 | 2.5% | 1.3215 | 0.4529 | 0.2% | 39.798 | 0.437 | 10.045 | 10.091 | 50.5 | 2.4048 | 55.099 |
| 33554432 | 1 | 2 | 1.4028 | 1.2% | 1.2906 | 1.0% | 1.3140 | 0.4535 | 0.3% | 39.780 | 0.436 | 10.039 | 10.113 | 57.0 | 2.4783 | 70.272 |

Almost Sorted Order (M elements out of order)

| N | M | Cnt | Comps_W | Sd | Comps_L | Sd | Fetch_L | Save_L | Sd | Part4+ | RePart | Sort3 | Sort2 | Recur | Ratio_W | Time |
|---|---|---|---|---|---|---|---|---|---|---|---|---|---|---|---|---|
| 32 | 4 | 96 | 1.1951 | 5.5% | 0.7171 | 5.6% | 0.8436 | 0.2305 | 31.3% | 33.138 | 0.000 | 11.947 | 11.686 | 3.6 | 1.1979 | 463.805 |
| 512 | 64 | 24 | 1.1459 | 3.5% | 0.8913 | 3.1% | 0.9642 | 0.2383 | 7.7% | 38.973 | 0.106 | 9.635 | 11.328 | 12.3 | 1.7560 | 61.325 |
| 512 | 8 | 24 | 1.0653 | 4.0% | 0.8286 | 4.0% | 0.9012 | 0.1514 | 26.2% | 34.277 | 0.033 | 14.095 | 8.309 | 8.9 | 1.2738 | 65.324 |

TABLE I-continued

| | | | | | | | | | | | |
|---|---|---|---|---|---|---|---|---|---|---|---|
| 512 | 1 | 24 | 1.0232 | 0.4% | 0.7958 | 0.4% | 0.5% | 0.8584 | 15.9% | 0.0593 | 28.288 | 0.000 | 20.947 | 2.751 | 7.3 | 1.0357 | 0.000 |
| 8192 | 1024 | 6 | 1.1753 | 2.0% | 0.9945 | 2.0% | 1.9% | 1.0422 | 6.0% | 0.2360 | 37.783 | 0.401 | 9.849 | 11.735 | 20.8 | 1.8939 | 37.781 |
| 8192 | 128 | 6 | 1.1184 | 2.1% | 0.9464 | 2.1% | 1.9% | 0.9969 | 6.6% | 0.1868 | 38.322 | 0.136 | 9.229 | 12.950 | 20.5 | 1.8636 | 37.989 |
| 8192 | 16 | 6 | 1.0562 | 2.2% | 0.8937 | 2.2% | 2.1% | 0.9459 | 15.3% | 0.1363 | 37.166 | 0.010 | 12.392 | 9.135 | 15.7 | 1.4242 | 36.755 |
| 8192 | 2 | 6 | 1.0221 | 0.6% | 0.8649 | 0.6% | 0.8% | 0.9144 | 28.0% | 0.0961 | 31.748 | 0.000 | 16.197 | 6.964 | 12.0 | 1.0909 | 36.173 |
| 131072 | 16384 | 4 | 1.1706 | 1.3% | 1.0329 | 1.3% | 1.2% | 1.0693 | 7.0% | 0.2360 | 37.446 | 0.447 | 9.890 | 11.950 | 29.5 | 1.9667 | 40.513 |
| 131072 | 2048 | 4 | 1.1259 | 1.6% | 0.9934 | 1.6% | 1.5% | 1.0307 | 6.0% | 0.1688 | 37.636 | 0.521 | 9.386 | 13.737 | 30.3 | 2.0167 | 39.854 |
| 131072 | 256 | 4 | 1.0713 | 1.0% | 0.9453 | 1.0% | 0.9% | 0.9847 | 4.5% | 0.1343 | 38.483 | 0.095 | 10.092 | 11.646 | 27.5 | 1.8333 | 39.170 |
| 131072 | 32 | 4 | 1.0390 | 0.4% | 0.9167 | 0.4% | 0.3% | 0.9576 | 6.9% | 0.1115 | 38.072 | 0.001 | 10.056 | 10.056 | 20.3 | 1.3500 | 38.184 |
| 131072 | 4 | 4 | 1.0142 | 0.3% | 0.8949 | 0.3% | 0.4% | 0.9312 | 14.4% | 0.0579 | 30.907 | 0.000 | 18.177 | 4.895 | 16.3 | 1.0833 | 36.737 |
| 2097152 | 32768 | 3 | 1.1270 | 0.5% | 1.0197 | 0.5% | 0.5% | 1.0491 | 3.4% | 0.1615 | 35.231 | 0.532 | 9.777 | 14.092 | 42.7 | 2.2456 | 50.127 |
| 2097152 | 4096 | 3 | 1.1086 | 0.5% | 1.0031 | 0.5% | 0.5% | 1.0327 | 2.0% | 0.1411 | 35.408 | 0.593 | 9.506 | 14.568 | 38.7 | 2.0351 | 50.149 |
| 2097152 | 512 | 3 | 1.0669 | 0.8% | 0.9653 | 0.8% | 0.7% | 0.9967 | 4.8% | 0.1148 | 37.822 | 0.156 | 9.795 | 12.529 | 33.0 | 1.7368 | 49.471 |
| 2097152 | 64 | 3 | 1.0533 | 1.4% | 0.9530 | 1.4% | 1.2% | 0.9850 | 7.8% | 0.1042 | 38.007 | 0.005 | 10.549 | 11.279 | 28.3 | 1.4912 | 47.761 |
| 2097152 | 8 | 3 | 1.0197 | 0.5% | 0.9226 | 0.5% | 0.5% | 0.9532 | 7.4% | 0.0666 | 34.509 | 0.000 | 15.998 | 5.905 | 21.7 | 1.1404 | 48.975 |
| 2097152 | 1 | 3 | 1.0010 | 0.1% | 0.9056 | 0.1% | 0.1% | 0.9300 | 70.4% | 0.0048 | 25.484 | 0.000 | 24.285 | 0.589 | 19.0 | 1.0000 | 48.014 |

Merging M equal sized blocks

| | | | | | | | | | | | |
|---|---|---|---|---|---|---|---|---|---|---|---|
| 32 | 2 | 96 | 2.2383 | 13.6% | 1.3430 | 13.6% | 13.0% | 1.4569 | 9.2% | 0.3895 | 41.374 | 0.000 | 8.691 | 9.993 | 9.7 | 3.2222 | 409.138 |
| 32 | 4 | 96 | 1.6469 | 14.4% | 0.9882 | 14.4% | 13.1% | 1.1012 | 8.8% | 0.4294 | 38.542 | 0.000 | 9.993 | 10.612 | 6.4 | 2.1424 | 758.155 |
| 32 | 16 | 96 | 1.4246 | 11.7% | 0.8548 | 11.7% | 10.8% | 0.9663 | 8.3% | 0.4426 | 37.533 | 0.000 | 10.352 | 10.645 | 5.5 | 1.8403 | 605.623 |
| 512 | 2 | 24 | 1.9221 | 6.2% | 1.4950 | 6.2% | 5.9% | 1.5619 | 2.4% | 0.4153 | 40.479 | 1.383 | 9.627 | 10.327 | 20.0 | 2.8571 | 55.033 |
| 512 | 4 | 24 | 1.6165 | 8.4% | 1.2572 | 8.4% | 8.0% | 1.3232 | 2.2% | 0.4360 | 40.072 | 0.684 | 9.635 | 10.319 | 16.4 | 2.3393 | 52.029 |
| 512 | 16 | 24 | 1.5208 | 7.9% | 1.1828 | 7.9% | 7.5% | 1.2485 | 2.4% | 0.4392 | 39.868 | 0.537 | 9.749 | 10.474 | 15.6 | 2.3221 | 59.904 |
| 512 | 64 | 24 | 1.4148 | 4.5% | 1.1004 | 4.5% | 4.3% | 1.1658 | 1.6% | 0.4402 | 39.880 | 0.439 | 9.880 | 10.441 | 15.5 | 2.2143 | 66.506 |
| 8192 | 2 | 6 | 1.9217 | 2.4% | 1.6260 | 2.4% | 2.3% | 1.6724 | 1.7% | 0.4386 | 41.091 | 0.920 | 9.359 | 10.152 | 36.2 | 3.2879 | 40.447 |
| 8192 | 4 | 6 | 1.6600 | 3.3% | 1.4047 | 3.3% | 3.2% | 1.4500 | 1.4% | 0.4420 | 39.852 | 0.454 | 10.071 | 9.973 | 26.2 | 2.3788 | 42.331 |
| 8192 | 16 | 6 | 1.4559 | 1.9% | 1.2319 | 1.9% | 1.8% | 1.2771 | 0.5% | 0.4468 | 39.712 | 0.435 | 10.055 | 10.311 | 24.7 | 2.2424 | 43.166 |
| 8192 | 64 | 6 | 1.4884 | 4.6% | 1.2594 | 4.6% | 4.5% | 1.3046 | 1.0% | 0.4461 | 39.823 | 0.450 | 9.932 | 10.189 | 25.8 | 2.3485 | 43.365 |
| 8192 | 256 | 6 | 1.4211 | 1.8% | 1.2024 | 1.8% | 1.8% | 1.2477 | 0.5% | 0.4486 | 39.825 | 0.492 | 10.057 | 10.020 | 25.2 | 2.2879 | 42.951 |
| 131072 | 2 | 4 | 1.9544 | 1.9% | 1.7245 | 1.9% | 1.9% | 1.7600 | 1.2% | 0.4410 | 40.760 | 0.947 | 9.368 | 10.399 | 60.0 | 4.0000 | 42.871 |
| 131072 | 4 | 4 | 1.5050 | 0.5% | 1.3280 | 0.5% | 0.5% | 1.3627 | 0.7% | 0.4498 | 39.954 | 0.455 | 9.989 | 10.063 | 36.5 | 2.4333 | 44.103 |
| 131072 | 16 | 4 | 1.4452 | 0.8% | 1.2751 | 0.8% | 0.8% | 1.3098 | 0.4% | 0.4503 | 39.804 | 0.428 | 10.046 | 10.080 | 35.5 | 2.3667 | 44.877 |
| 131072 | 64 | 4 | 1.4537 | 0.9% | 1.2826 | 0.9% | 0.9% | 1.3172 | 0.4% | 0.4509 | 39.822 | 0.427 | 10.037 | 10.098 | 35.3 | 2.3500 | 44.786 |
| 131072 | 256 | 4 | 1.4956 | 4.0% | 1.3196 | 4.0% | 3.9% | 1.3542 | 0.6% | 0.4480 | 39.823 | 0.427 | 10.044 | 10.066 | 38.3 | 2.5500 | 44.987 |
| 131072 | 1024 | 4 | 1.4354 | 1.5% | 1.2665 | 1.5% | 1.5% | 1.3010 | 0.3% | 0.4518 | 39.802 | 0.450 | 10.055 | 10.060 | 34.3 | 2.2833 | 45.001 |
| 2097152 | 2 | 2 | 2.0004 | 0.0% | 1.8099 | 0.0% | 0.0% | 1.8385 | 1.6% | 0.4402 | 40.776 | 0.959 | 9.378 | 10.351 | 83.0 | 4.3684 | 55.811 |
| 2097152 | 4 | 2 | 1.5773 | 1.0% | 1.4271 | 1.0% | 1.0% | 1.4553 | 0.0% | 0.4481 | 39.968 | 0.457 | 9.958 | 10.094 | 46.0 | 2.4211 | 57.276 |
| 2097152 | 16 | 2 | 1.4524 | 1.4% | 1.3141 | 1.4% | 1.4% | 1.3421 | 0.2% | 0.4536 | 39.804 | 0.431 | 10.037 | 10.107 | 46.5 | 2.4474 | 57.648 |
| 2097152 | 64 | 2 | 1.4531 | 1.3% | 1.3147 | 1.3% | 1.3% | 1.3427 | 0.1% | 0.4542 | 39.790 | 0.435 | 10.053 | 10.087 | 46.0 | 2.4211 | 57.550 |
| 2097152 | 256 | 2 | 1.4360 | 1.8% | 1.2992 | 1.8% | 1.7% | 1.3272 | 0.4% | 0.4539 | 39.803 | 0.436 | 10.041 | 10.044 | 44.5 | 2.3421 | 58.803 |
| 2097152 | 1024 | 2 | 1.4575 | 4.6% | 1.3187 | 4.6% | 4.5% | 1.3466 | 1.0% | 0.4512 | 39.805 | 0.441 | 10.032 | 10.109 | 48.0 | 2.5263 | 61.008 |
| 2097152 | 4096 | 2 | 1.4309 | 0.8% | 1.2946 | 0.8% | 0.8% | 1.3225 | 0.2% | 0.4563 | 39.788 | 0.438 | 10.099 | 10.107 | 46.0 | 2.4211 | 58.438 |

TABLE II

Sorting Performance Summary

| N | M | Cnt | Comps_L | Fetch_L | Save_L |
|---|---|-----|---------|---------|--------|
| *Sorted Order* | | | | | |
| 32 | | 1 | WdaSort | Qsort | WdaSort |
| 128 | | 1 | WdaSort | Qsort | WdaSort |
| 512 | | 1 | String | Qsort | WdaSort |
| 2048 | | 1 | String | Qsort | WdaSort |
| 8192 | | 1 | String | Qsort | WdaSort |
| 32768 | | 1 | WdaSort | Qsort | WdaSort |
| *Reverse Order* | | | | | |
| 32 | | 1 | WdaSort | Qsort | WdaSort |
| 128 | | 1 | WdaSort | Qsort | WdaSort |
| 512 | | 1 | String | Qsort | WdaSort |
| 2048 | | 1 | String | Qsort | WdaSort |
| 8192 | | 1 | String | Qsort | WdaSort |
| 32768 | | 1 | WdaSort | Qsort | WdaSort |
| *Random Order* | | | | | |
| 32 | | 96 | WdaSort | Qsort | WdaSort |
| 128 | | 48 | WdaSort | Qsort | WdaSort |
| 512 | | 24 | WdaSort | Qsort | WdaSort |
| 2048 | | 12 | WdaSort | Qsort | WdaSort |
| 8192 | | 6 | WdaSort | Qsort | WdaSort |
| 32768 | | 3 | WdaSort | Qsort | WdaSort |
| *Almost Sorted Order* | | | | | |
| 32 | 4 | 96 | WdaSort | WdaSort | WdaSort |
| 512 | 64 | 24 | WdaSort | WdaSort | WdaSort |
| 512 | 8 | 24 | WdaSort | WdaSort | WdaSort |
| 512 | 1 | 24 | WdaSort | WdaSort | WdaSort |
| 8192 | 1024 | 6 | WdaSort | WdaSort | WdaSort |
| 8192 | 128 | 6 | WdaSort | WdaSort | WdaSort |
| 8192 | 16 | 6 | WdaSort | WdaSort | Quick |
| 8192 | 2 | 6 | WdaSort | WdaSort | Quick |
| *Merging M equal sized block* | | | | | |
| 32 | 2 | 96 | Shell | Qsort | WdaSort |
| 32 | 4 | 96 | Shell | Qsort | WdaSort |
| 32 | 16 | 96 | WdaSort | Qsort | WdaSort |
| 512 | 2 | 24 | String | Qsort | String |
| 512 | 4 | 24 | Quick | Osort | WdaSort |
| 512 | 16 | 24 | WdaSort | Qsort | WdaSort |
| 512 | 64 | 24 | WdaSort | Qsort | WdaSort |
| 8192 | 2 | 6 | String | Qsort | String |
| 8192 | 4 | 6 | String | Qsort | String |
| 8192 | 16 | 6 | WdaSort | Osort | WdaSort |
| 8192 | 64 | 6 | Quicker | Qsort | WdaSort |

The Already Sorted Order

If the array is already sorted, notice that WdaSort has Comps_W at the ideal; 1.000. The reason that the smaller arrays are not displayed as exactly 1.000 arises from the ideal comps equation: (N+1)*Log2(N)−(N−1)*2. As N gets larger, (N+1) and (N−1) converge to simply N and the equation can be more neatly expressed as N*Log2(N/4). But, even with the smallest 32 element array, the inaccuracy introduced here is only 7.3%.

Comparing WdaSort's Comps_L column to Loeser's "Compares" column shows that Wda Sort beats all Qsort derivatives and almost exactly matches the shellsort comparisons. Although StringSort is almost twice as fast as WdaSort in this nothing-to-do situation, StringSort demonstrates very poor performance when real work arises as clearly demonstrated in the almost sorted case.

It is interesting to note that the Fetch_L column is nearly equal to the Comps_L column. The difference comes from loading the initial partitioning element. The difference quickly becomes negligible as the size of the array increases.

The Save_L column is zero for the already sorted order and never goes higher than 0.456. Comparing it to Loeser's "Stores" indicates that WdaSort is among, if not the, fastest.

Part4+ is called exactly 25% of N times. Also, note that Sort3 plus Sort2 is exactly 25% of N again. These are the hypothetical minimums. Of course there was no re-partitioning to do either.

Ratio_W confirms the ideal recursion formula: Log2(N/4).

Time tells us that the largest 33,554,432 element sort took 15 hours to perform.

The Reverse Sorted Order

WdaSort performs this case almost exactly the same as the Already Sorted case, above. The only exception being Save_L. Comparing this with Loeser's "Stores" shows that QuickSort and Qsort match WdaSort, but nobody beats it. Here, the efficiency of quicksort methods are apparent when there is real work to do.

Few of the algorithms handled the simple reversing of order efficiently.

The Random Order

This is the case traditionally considered the most common burden for a sort method. Few things alter the difficulty of a randomized array except when the number of array elements approach the numeric range of one of the elements. This is pertinent for purposes of comparison because Loeser apparently filled his test arrays with 15 to 16 bit random numbers. This indicates that there will probably be several duplicate values in his largest arrays, thereby reducing the complexity of the sort. The above tests use 30 random numbers and could raise WdeSort's ratio's ever so slightly in comparison.

Not that Comps_W hovers around 1.41 with a standard deviation of about 1.5% for this case. Perfecting this value was achieved in a trade off between 1.39 with no safety measures and 1.47 for the best behaved sort, from a maximum recursion depth point of view, using a 75% sweet spot.

Comps_L almost exactly mirrored that of QuickerSort. Save_L almost exactly mirrored that of QuickSort.

Note that Part4+ is called just under 40% N times and RePartitions were only done 0.44% N times or for 1.11% of the Part4+ calls. Also, Sort3 and Sort2 are being called at just over 10% N times each. The number values behind these percentages are but a fraction of the number of fetch & compare iterations. Therefore, there is no linear component in the WdaSort time function: Time*Comps_W*N*Log2(N/4).

The Ratio_W value averages 2.4 with a standard deviation of 4.2%. Note that the maximum recursion depth reached just slightly past halfway up the 100 recursion limit for our largest array of 33,554,432 elements. Incidentally, the Time value implies that sorting this array took about 21 hours.

The Almost Sorted Order

This is one of the most common cases in practice—sort an array, append or update a few elements, and then re-sort the array. This is also where the present method clearly demonstrates its superiority for most all of the columns, even Fetch_L. Note that Comps_W rises somewhat proportionally to the percentage of out-of-place entries in the array. A first attempt to quantify Comps_W as a function of M/N resulted in 1.055+0.975*M/N.

Qsort performance degrades significantly in this case. Virtually all statistics are poor, especially the Standard Deviations.

The Merge (equal-length) Block Order

This is just about the worst case for the quicksort family. Merging two equal length blocks performs similar to the dreaded pipe organ case with Comps_W averaging about 1.95. But increasing the block count to four reduces it to a more reasonable 1.6.

Ratio_W shows it's worst case performance too, going as high as 4.4 for 2,097,152 & 2. If an application regularly needs to work on such arrays, reducing WdaSort's sweet spot to 75%N will bring Ratio_W down to a more reasonable 2.11 in exchange for increasing Comps_W by about five percent across the board.

Conclusion

It is interesting to note that Loeser did not benchmark any of the cases in which Qsort operates least effectively, namely, identical elements, 1's and 0's, and the pipe organ case. However, the method of the present invention has outperformed the Loeser benchmarks on all of the problem cases.

WdaSort is designed to be part of a programming library that can be called upon for small and large jobs alike. The calling interface makes no direct references to the array and only requires three routines: load a record, save a record, and compare two loaded records. This way, the programmer is free to store and manipulate the array elements as he or she so chooses.

WdaSort currently requires up to 3 Kb of free stack space under DOS to perform. This stack size should allow sorting arrays approaching a billion elements in size. If the size and/or complexity of an array exceeds this limit, the program gracefully backs out of the first sort attempt and reconfigures itself for an automatic, and more cautious, retry. Where, the second attempt is almost guaranteed to succeed since the file has already been partially sorted. This cautious configuration typically requires only half as much stack depth to sort complex arrays.

In one embodiment, a three record buffer is used in the Partition code. One element is loaded with the partition value (Pvalue). One element holds an array element being compared to the Pvalue, and one element holds the opposite value being compared to the Pvalue. That way, the Pvalue is loaded only once per call to partition, record swaps can be performed by merely cross saving the buffers. This permits quick processing even for large arrays of, for example, over one million elements, even if stored on a hard disk or other computer peripheral storage device.

The present invention also utilizes a programmer interface unlike any other commercially available known sort. The standard C library Qsort() is designed strictly for memory arrays. It is called with array pointer, number of elements, element size, and function to compare elements by address. The caller has no control of the array while it is being sorted, so everything is constrained by memory limitations. The WdaSort or the present invention, on the other hand, operates through a three element buffer and requests that the programmer place specific array elements (or records if you will) in one of the three buffers. This allows the most freedom for writing memory sorts, disk file sorts, or any cached mixture thereof. WdaSort is called with first and last array indexes, loadbuf function, savebuf function, and compare_buffer function. WdaTest2.c in the Appendix provides an example of how this is best used.

WdaSort may be offered as part of the standard 'C' programming environment of any platform. WdaSort will be tremendously faster on the 32 bit machines since nearly all variables are in long integer format.

Source code for implementing the sorting method according to the present invention is shown in the appendix.

APPENDIX

```c
/* WdaSort ----------------------------------------------------------------*/

/*  NOTE:  This module expects AT LEAST 3K of FREE stack space.  So,
    if your program runs fine in the default 2K stack, just recompile it
    with a 5K stack (i.e: link /st:0x1400...). (see Qsort() prologue)
*/ include <stdio.h>              /* std I/O values (Got'ta have it!) */
include <stdlib.h>             /* for rand() and srand()           */
include <time.h>               /* time() used to seed random numbs */ include "wda_defs.h"           /* standard information defines     */
include "errorlog.h"           /* Errorlog routine #defines        */
include "wdasort.h"            /* double check Wsort prototype     */ define RECURSION_LIMIT 100     /* limit additional free stack usage to 3K */

INT8 Q_maxdepth, Q_panic;       /* misc housekeeping and panic button */

INT32 Q_parts, Q_reparts, Q_part3, Q_part2;  /* for study */

/* The following variables & routines scope has been limited to this file. */ static INT32 Q_tmp;                     /* keep Qsort temp var off stack */
static INT8 MinTest, SweetShift;        /* SweetSpot Adjusting Variables */
static INT8 Q_curdepth, Q_padding;      /* misc variables, latter unused */ static int  (_fastcall * Loadrec)( long idx, INT8 bufidx );
static int  (_fastcall * Saverec)( long idx, INT8 bufidx );
static int  (_fastcall * Comprec)( INT8 aidx, INT8 bidx );

static void _fastcall Qsort( long lodx, long hidx );
static long _fastcall randelem( long lodx, long hidx );
static long _cdecl partition( long lodx, long pidx, long hidx );
static int  _fastcall loadcomp( long i, INT8 bufidx );
static void _fastcall threesort( long lodx, long hidx );
static void _fastcall twosort( long lodx, long hidx );

int _cdecl
Wsort( fridx, toidx, loadrec, saverec, comprec )  /*--------------------
    Entry point to sort a file.  The Static globals are set here and
    the first call made to Qsort.

------------------*/
    long fridx, toidx;
    void (_fastcall * loadrec)( long idx, INT8 bufidx );
    void (_fastcall * saverec)( long idx, INT8 bufidx );
    int  (_fastcall * comprec)( INT8 aidx, INT8 bidx );
{
  Loadrec = loadrec ; Saverec = saverec ; Comprec = comprec ;

srand( (short)time( NULL ) );    /* seed random number generator */

/* The sweet spot size (in percent) is 100 * ( 1 - 2 / MinTest ).
   * MinTest is always a power of two to avoid a full division in code.
   * SweetShift is exponent of two used by an Arithmetic Shift operation.
   */
  MinTest = 32 ; SweetShift = 5;   /* 93.75% Sweet Spot initially */

/* Setup the static housekeeping globals and start the ball
   * rolling with the initial call to Qsort( element_range ).
   */
  while( 1 )  /* while recursion depth hits the limit */
  {
    Q_maxdepth = Q_curdepth = 0 ; Qsort( fridx, toidx ) ; /* tah-dah! */ if ( Q_panic ) return( 1 );      /* somebody panic'd - abort sort */ if ( Q_maxdepth < RECURSION_LIMIT ) break;  /* depth not limited */ errorlog( MINOR, "Qsort recursion depth limited, starting over." );

if ( SweetShift == 5 )  /* This is the first time it happened */
    {
      errorlog( NOTE, "Reducing sweet spot size from 93.75%% to 75%%." );

MinTest = 8 ; SweetShift = 3;   /* 75% Sweet Spot at limits */
    }
  } /* closing while recursion depth hits the limit */ return( 0 );
}
```

```
long _fastcall
randlong( modulus )  /*-------------------------------------------------

Generates a 30 bit random number from two 15 bit random numbers

This routine will never return a value greater than 0x3fffffff

Note that the modulus limiting technique can produce uneven    distributions when randval does not extend
at least 2 * modulus.
    This effect was minimized my forcing randval to be at least
    4 * modulus.

---------------*/
    INT32 modulus;  /* 1..0x10000000L inclusive or 0x40000000L */
{
  register long randval = rand();        /* 15 bits */ if ( modulus >= 0x2000L )              /* 13 bits + one */
  {
     randval <<= 15 ; randval |= rand();      /* 30 bits! */
  } if ( modulus >= MAXMODULUS )  return( randval );  /* max */ return( randval % modulus );   /* up to 28 bits returned */
} static long _fastcall
randelem( lodx, hidx )  /*---------------------------------------------

Select a random element within the given range.

This is called only for re-partitioning.

----------------*/
    long lodx, hidx;
{
  ++Q_reparts ; return( lodx + randlong( hidx - lodx + 1L ) );
} static void _fastcall
Qsort( lodx, hidx )  /*-------------------------------------------------

This routine partitions the given range and then calls itself RECURSIVELY
  to sort the lower and higher sub-arrays. I chose quickersort over the
  the competing sorts mainly because it minimizes the number of swaps
  needed (especially with lseeks!) and ideally recurses only log2( N ).
  Thus, for our hypothetical million record array this would be 20 times.
  Knowing that each recursion uses 22 bytes of stack space ( hidx, lodx,
  return pointer and 5 word registers ) our sort stack requirement would
  be about 440 bytes.

Our 3K (free) stack will allow us at least 100 recursions before getting
  critical. If we get to this point, the program will gracefully stop
  recursing so that you can re-start the sort. It is almost guaranteed
  not to recurse as deep on the second attempt since the file has already
  been partially sorted and we use a cautious sweet spot size.  Wda...
  ------------------*/
  long lodx, hidx;  /* array boundary offsets */
{
  long pidx = partition( lodx, ( lodx + hidx ) / 2, hidx ) ; ++Q_parts;

/* Ok, I realize that the classic Qsort algorithm has it's flaws. The
   * standard partition assumes Pvalue is in the middle of the array and
   * sometimes, that just doesn't happen to work out. Rather than forcing
   * the poor guy to live with his error, let's give him another chance
   * and try a random element like the original quicksort did. Wda...
   */
  if ( (Q_tmp = hidx - lodx) >= (long) MinTest )  /* large enough? */
  {
     Q_tmp >>= SweetShift; /* divide by MinTest once for two tests */ if ( pidx = lodx + Q_tmp )     /* converged low, "meat" high */
        Q_tmp = pidx + 1L ; /* lodx of "meaty" side of 1st partition */
        pidx = partition( lodx, randelem( pidx + 1L, hidx ), hidx );

else if ( pidx = hidx - Q_tmp )    /* conv high, "meat" low */
        Q_tmp = pidx - 1L ; /* hidx of "meaty" side of 1st partition */
        pidx = partition( lodx, randelem( lodx, pidx - 1L ), hidx );
  }

/* Note that a re-partition of the range lodx..hidx only considers the leftover "meat" from the first
 attempt. This avoids all values that are guaranteed NOT to be an improvement. Wda...
```

```
  if (( Q_panic )     /* external program pressed the panic button */
   || ( Q_curdepth >= Q_maxdepth )   /* we've reached a new depth */
   && (( Q_maxdepth = Q_curdepth ) == RECURSION_LIMIT ))
     return;  /* The recursion stops here when necessary */

Q_tmp = pidx - lodx;    /* size of lower range left to consider */ if ( Q_tmp > 3L )     /* Call ourself to sort lower range */
  {
    ++Q_curdepth ; Qsort( lodx, pidx - 1L ) ; --Q_curdepth ;
  } else
    switch( (short) Q_tmp )  /* element size of sub-array */
    {
      case 3 : threesort( lodx, pidx - 1L ) ; break;
      case 2 : twosort( lodx, pidx - 1L ) ; break;
      default: /* forget it */ break;
    }

Q_tmp = hidx - pidx;   /* size of upper range left to consider */ if ( Q_tmp > 3L )     /* Call ourself to sort upper range */
  {
    ++Q_curdepth ; Qsort( pidx + 1L, hidx ) ; --Q_curdepth ;
  } else switch( (short) Q_tmp )  /* element size of sub-array */
  {
    case 3 : threesort( pidx + 1L, hidx ) ; break;    case 2 : twosort( pidx + 1L, hidx ) ; break;
    default: /* forget it */ break;
  }
} static long _cdecl
partition( lodx, pidx, hidx ) /*------------------------------------------

Quickersort partitioning - classic style, with twin synchronous indexes.

Arbitrarily select the partition value as the value currently in the middle
  of the array. If the middle falls between elements, use the lower one.

Bring the indexes in SYNCHRONOUSLY from both ends, swapping out of place
  values until the indexes collide (hopefully in the middle).

Both indexes skip right over the partition value if they come to it.
  (This value will be relocated to where the indexes finally meet.)

On Return, Especially note that the array has the following properties:

1. The returned index is in it's final position (ideally, the midpoint).

2. All remaining elements are on their proper side or equal to partition.

-----------------------*/
  long lodx, pidx, hidx;  /* High and low boundary indexes, the "twins" */
{
  int cmp;  /* used for saving the compare() function value */ define LOBUF  (INT8) 0  /* Low side partition element buffer index    */
define PVBUF  (INT8) 1  /* Partition Value element buffer index       */
define HIBUF  (INT8) 2  /* High side partition element buffer index   */ define _none_ (INT8) 0  /* reset value used to clear flag variable    */
define hi_off (INT8) 1  /* high side value a hidx belongs on low side */
#define lo_off (INT8) 2  /* low side value a lodx belongs on high side */
#define _both_ (INT8) 3  /* we have a matching set of offsiders, swap! */

INT8 flags = _none_ ;  /* variable for hi_off, lo_off, both & none */

Loadrec( pidx, PVBUF );   /* Load Pvalue in buffer to minimize I/O */

/* We can shift the indexes synchronously, but we cannot allow them
   * to cross. Therefore, if the twins end up beside each other we can
   * only shift one of them. This problem is related to when there are
   * two possibilities for the initial Pvalue position. Since we need
   * to end up in that same spot whenever possible, we need to favor
   * shifting the higher index when we can arbitrarily shift either.
   * Therefore, I simply consider the high side first.   Wda...
   */  while ( ! Q_panic )  /* watch external program panic button */
  {
    if ( ! (flags & hi_off) )  /* if no high side offsider... */
    {
      if (( hidx != pidx && (cmp = loadcomp( hidx, HIBUF )) < 1 )
        && ( cmp == -1 || (flags & lo_off)) )
         flags |= hi_off;  /* offsides */
```

```
        else if ( --hidx == lodx )  break;
    } if ( ! (flags & lo_off) )   /* if no low side offsider... */
    {
        if (( lodx != pidx && (cmp = loadcomp( lodx, LOBUF )) > -1 )
         && ( cmp == 1 || (flags & hi_off)) )
            flags |= lo_off;  /* offsides */ else if ( ++lodx == hidx )  break;
    } if ( flags == _both_ )  /* need matching set of offsiders */
    {
        /* Swap records by cross saving the buffers.  That's saving the
         * hi_buffer at the low_index and the low_buffer at the hi_index.
         */
        Saverec( lodx, HIBUF ) ; Saverec( hidx, LOBUF ) ; flags = _none_ ;

if ( --hidx == lodx || ++lodx == hidx )  break;

/* else - we're ready for the next loop */
    }
}  /* while( twin indexes have not collided ) */

/* Well, we're almost done now.  If we were extremely lucky, the col-
 * lision happened smack on top of the partition value and we can quit.
 * (Also note that from this point on, lodx == hidx, we can use either)
 */
if ( pidx == lodx || Q_panic )  return( pidx );  /* We're outta here! */

/* Ok, the collision didn't happen smack on top of the Pvalue.  But,
 * if we were looking for a matching offsider when they hit, we can
 * determine where Pvalue fits in relation to the converged element.
 * ( Only the second offsider gets the relaxed criteria treatment )
 * Otherwise, the collision happened on top of a value that hasn't
 * been compared to Pvalue yet; do it now.  (Note that there is
 * always EXACTLY N-1 comparisons necessary to partition an array)
 *
 * It's not immediately obvious but, from here on, the flags variable
 * is used to hold the buffer index value where the converged element
 * resides.  This was done to avoid repeatedly testing flags for lo_off
 * and hi_off in the remainder of the subroutine's code.   Wda...
 */  switch( flags )  /* last use as _none_, hi_off and lo_off */
{
  case _none_ : flags = HIBUF ; cmp = loadcomp( hidx, flags );

if ( cmp == 0 )  return( hidx );

/* else */  break;

case hi_off : flags = HIBUF ; cmp = -1 ; break ;

case lo_off : flags = LOBUF ; cmp =  1 ; break ;

default : errorlog( CRITICAL, " Bad value in partition switch " );
             ++Q_panic ; return( hidx );
}

/* Now the really tough cases:  The indexes have converged at an array
 * element and we have to figure out how to swap in (or cross save) the
 * partition value that we have been ignoring up until now.   Wda...
 */
if ( hidx > pidx )      /* Partition converged above initial pidx */
{
    if ( cmp == 1 )  Loadrec( --hidx, flags );   /* conv elem > PV */

Saverec( pidx, flags ) ; Saverec( hidx, PVBUF ) ; return( hidx );
}

/* else ( lodx < pidx )  Partition converged below initial pidx
 */
if ( cmp == -1 )  Loadrec( ++lodx, flags );    /* conv elem < PV */

Saverec( pidx, flags ) ; Saverec( lodx, PVBUF ) ; return( lodx );

#undef LOBUF    /* Don't allow #defines to outlive their usefulness */
#undef PVBUF
#undef HIBUF
#undef hi_off
#undef lo_off
#undef _both_
#undef _none_

}
```

```
static int _fastcall
loadcomp( i, bufidx ) /*------------------------------------------------

Load generic record and compare it to the partition value stored *Buff[1]

--------*/
   long i;
   INT8 bufidx; {
   Loadrec( i, bufidx ) ; return( Comprec( bufidx, 1 ) );
} static void _fastcall
threesort( lodx, hidx ) /*-----------------------------------------------

The Special case of sorting a 3 element array within the buffers

Noting that there are exactly 6 possibilities we can discern with
   three comparisons at most. Here I build the switch table;

Seq is sequence where identical values are judged in sequence.
   Bits are set true for the corresponding out-of-sequence test.
   Save is the buffer order to save in, '-' meaning ok as is.

Seq    Bits   Save     Notes:
        a b c  x00    ---      two tests and we're done!
        a c b  001    -21      right pair out of sequence
        b a c  010    10-      left pair out of sequence
        b c a  101    201      three saves are better than two swaps
        c a b  110    120      (each swap implies two saves)
        c b a  x11    2-0      ends out of sequence ----------------*/
   long lodx, hidx;
{
   long midx = lodx + 1;

#define RIGHT  0x01
#define LEFT   0x02
define ENDS   0x04 int flags = 0;

++Q_part3 ; Loadrec( lodx, 0 ) ; Loadrec( midx, 1 ) ; Loadrec( hidx, 2 );

if ( Comprec( 0, 1 ) == 1 )  flags |= LEFT;
   if ( Comprec( 1, 2 ) == 1 )  flags |= RIGHT;

if ( ! flags )  return;  /* Already in order! */ if ( flags != 3 && Comprec( 0, 2 ) == 1 )  flags |= ENDS;

switch( flags )
   {
   case 1 : /* lodx ok as is */  Saverec( midx, 2 ) ; Saverec( hidx, 1 ) ; break;
   case 2 : Saverec( lodx, 1 ) ; Saverec( midx, 0 ) ; /* hidx ok as is */ break;
   case 3 : Saverec( lodx, 2 ) ; /* midx ok as is */ Saverec( hidx, 0 ) ; break;
   case 5 : Saverec( lodx, 2 ) ; Saverec( midx, 0 ) ; Saverec( hidx, 1 ) ; break;
   case 6 : Saverec( lodx, 1 ) ; Saverec( midx, 2 ) ; Saverec( hidx, 0 ) ; break;
   default: errorlog( MAJOR, "bad flag value in threesort(): %d", flags );
            ++Q_panic;
   } undef RIGHT
undef LEFT
#undef ENDS

} static void _fastcall
twosort( lodx, hidx ) /*--------------------------------------------------

Sort a two element array - a rather trivial process after the above

----------------*/
   long lodx, hidx;
{
   ++Q_part2 ; Loadrec( lodx, 0 ) ; Loadrec( hidx, 1 ) ;

if ( Comprec( 0, 1 ) == 1 )  /* if lodx > hidx */
   {
      Saverec( lodx, 1 ) ; Saverec( hidx, 0 ) ;
   }
}
```

```
/*------------------------------------      -------------------------- Prologue WdaTest.c  --  Program designed to test, exercise and study WdaSort.
   Version 2  --  Access Virtual Array Data File through 400Kb disk cache.

As you know, the WdaSort module is designed as a generic programing tool.
   This module is intended to flesh out WdaSort into a complete application
   that can be intimately studied and benchmarked against peer algorithms.

In words; this module parses the command line arguments and initializes
   the virtual array using an external module.  This allows various cases
   to share the main body of code.  Once the array and study variables are
   setup, Wsort() is called to sort out the array.  Things monitored are:

Q_comps    - The number of comparisons required to sort array
       Q_fetch    - The number of records fetched  "
       Q_store    - The number of records saved    "
       Q_parts    - The number of calls to partition n > 3
       Q_reparts  - The number of re-partitions done
       Q_part3    - The number of calls to sort a 3 element subarray
       Q_part2    - The number of calls to sort a 2 element subarray
       stopwatch  - The number of seconds required to sort entire array
       Q_dotrig   - The number of comparisons needed to trigger a screen dot
       Q_dotctr   - The number of comparisons accumulating towards Q_dotrig
       Q_panic    - Set Boolean true in this module to abort WdaSort routine.

Before the sort is begun, this module calculates the baseline ideal numb
   of comparisons for the given array and divides by 80 columns.  The idea
   is to display the comparison dots progressing accross the screen to give
   the researcher some inkling as to how much time is left in the sort.
   Ideally, if the array is already in order, only one full line is filled
   with dots.  If we are sorting out a randomized case, 1.4 lines will be
   filled with dots.  But, there will seldom be more than two lines of dots
   since the worst (pipe organ) case comparison ratio does not exceed 2.11.
   ( Due to rounding errors, the display is visually incorrect for N < 160 )

After the sort has completed, the study variables are converted to ratios:

r0 - The ratio of comparisons (Q_comps) to Wda's Ideal: N * Log2( N/4 )
       r1 - The ratio of comparisons (Q_comps) to Loeser's Base: N * Log2( N )
       r2 - The ratio of fetches (Q_fetch) to Loeser's Base: N * Log2( N )
       r3 - The ratio of saves (Q_store) to Loeser's Base: N * Log2( N )
       r4 - The number of calls to partition n > 4 as a percentage of N
       r5 - The number of repartitions as a percentage of N
       r6 - The number of 3 element subarray sorts as a percentage of N
       r7 - The number of 2 element subarray sorts as a percentage of N
       r8 - The maximum recursion depth ratio to Wda's ideal: Log2( N/4 )
       r9 - The total sorting time divided by comparisons: MicroSeconds The array size and the above ratios are logged to the screen and a disk
   file for a higher level analysis.  Before this module completes, it
   verifies that the array has indeed been correctly sorted and flushes   the cache buffers out to disk.

Although the higher level analysis is discussed in a different document,
   I should hereby disclose that the ratios r1 through r3 are created spec-
   ifically to correlate with an outstanding bechmark series entitled:
   "Some Performance Tests of QuickSort and Descendants" by Rudolf Loeser
   of the Smithsonian Astrophysical Observatory.  (ACM, March 1974)

History:

07-xx-92  Wda  Original design and coding for formal publication.
```

```
10-xx-92  Wda  Split from of WdaSor    it can go back into library.
01-14-93  Wda  Added disk cache to cut testing time by about 80%
03-12-93  Wda  Split initialization routine out to separate modules.
04-07-93  Wda  Dressed up this module's comments for publication.

-----------------------------------------------------------------------*/ include <stdarg.h>              /* for va_start, va_arg(), va_end() */
include <stdio.h>               /* std I/O values (Got'ta have it!) */
#include <stdlib.h>              /* for rand() and srand()           */
#include <malloc.h>              /* for malloc(), calloc(), etc.     */
#include <fcntl.h>               /* for file handle struc (O_RDWR)   */
#include <math.h>                /* for log(), ceil(), floor(), etc. */
#include <time.h>                /* for time() (used as random seed) */
include <io.h>                  /* low-level file handling and I/O  */ include <sys\types.h>           /* needed by sys\stat.h             */
include <sys\stat.h>            /* for file handle status (S_IWRITE)*/ include "wda_defs.h"            /* standard information defines     */
include "errorlog.h"            /* Errorlog routine #defines        */
include "wdasort.h"             /* double check Wsort prototype     */ define EXT                      /* declare global declarations here */
include "wdatest2.h"            /* Global Initialization definitions*/
undef EXT                       /* don't leave EXT define hanging   */ extern char Datnam[], Lognam[];  /* data and logging file names */ static struct cache
{
  INT8  next;        /* next cache record in chain     */
  INT8  prev;        /* previous cache record in chain */
  INT32 offs;        /* base offset of sub_array       */
                     /* sizeof( struct cache ) = 6 BYTES */
} Cache[ MAXCACHE ];

static INT8 Head, Tail;   /* head and tail of cache usage chain */ static long Q_comps, Q_fetch, Q_store, Q_dotctr;   /* Study Var's */
static long N, M, Abuf[3];                         /* Foundation */ static int DatFd;    /*
Scratch Pad */ static int _fastcall hello( int argc, char *argv[] );
static int _fastcall study( void );
static void _fastcall flushcache( void );

int _cdecl
main( argc, argv ) /*---------------------------------------------------

Command line usage:  WdaTest N <M>

Where N is the size of the array to be initialized, and
    M is is the optional argument used by different initializations --------------*/
  int argc;
  char *argv[];
{
  if ( hello( argc, argv ) || init( N, M ) ) exit( 1 );
```

```
  Q_panic = 0 ; /* don't panic, we jus   .Je a new file */ exit( study() );  /* the rest of the study is automatic */
} void _fastcall
loadbuf( idx, bufidx )  /*----------------------------------------------
                            This routine loads a record into a buffer
  ----------*/
  long idx;
  INT8 bufidx;
{
  ++Q_fetch ; Abuf[ bufidx ] = Buff[ getcache( idx ) ].a[ idx & CACHEMASK ];
} void _fastcall
savebuf( idx, bufidx )  /*----------------------------------------------
                            This routine saves a record from a buffer
  -----------*/
  long idx;
  INT8 bufidx;
{
  ++Q_store ; Buff[ getcache( idx ) ].a[ idx & CACHEMASK ] = Abuf[ bufidx ];
} int _fastcall
compbuf( aidx, bidx )  /*-----------------------------------------------
                            This routine compares two record buffers   ----------------*/
  INT8 aidx, bidx;
{
  long A = Abuf[ aidx ] ;
  long B = Abuf[ bidx ] ;

if ( ++Q_dotctr >= Q_dotrig )
  {
    putchar( '.' ) ; Q_comps += Q_dotctr ; Q_dotctr = 0L ;
  } if ( A > B ) return( 1 );
  if ( A < B ) return( -1 );

/* Else */ return( 0 );
} static int _fastcall
study()  /*-------------------------------------------------------------

Request Sort, Verify correctness, and calculate study variables

-------*/
{
  double l2n, r0, r1, r2, r3, r4, r5, r6, r7, r8, r9;    /* ratios */
  INT32 stopwatch;
  FILE *Log;
  long I;

/* Ensure that study variables are reset before calling Wsort
  */
```

```
Q_comps = Q_fetch = Q_store = Q_dotc
Q_parts = Q_reparts = Q_part3 = Q_part2 = 0L;

/* Setup dotshow trigger value: N * Log2( N/4 ) / 80 columns
*/
Q_dotrig = 0.5 + N * ( log( N ) / log( 2.0 ) - 2.0 ) / 80;

stopwatch = time( NULL );            /* Start! */ if ( Wsort( 0L, N - 1L, loadbuf, savebuf, compbuf ))
   printf( "- Panic! -" );

stopwatch = time( NULL ) - stopwatch;  /* Stop! */

Q_comps += Q_dotctr ;      /* pickup comps pending dot trigger */

/* Calculate study variables and log to disk and display
*/
l2n = log( (double) N ) / log( 2.0 );       /* Log2( N ) */
 r0 = (double) Q_comps / ( N * ( l2n - 2.0 ));  /* ratio to ideal */ r1 = (double) Q_comps / ( N * l2n );       /* ratio to NL2N */
r2 = (double) Q_fetch / ( N * l2n );       /* ratio to NL2N */
r3 = (double) Q_store / ( N * l2n );       /* ratio to NL2N */ r4 =  100.0 * Q_parts / N;                 /* % ratio to N */
r5 =  100.0 * Q_reparts / N;               /* % ratio to N */
r6 =  100.0 * Q_part3 / N;                 /* % ratio to N */
r7 =  100.0 * Q_part2 / N;                 /* % ratio to N */ r8 = (double) Q_maxdepth / ( floor( l2n ) - 2 ); /* ratio to ideal */ r9 = 1E6 * stopwatch / Q_comps;  /* micro-seconds per "loadcomp()" */ printf( "(%7.4f,%6.2f microsec )\n", r0, r9 );    /* term dotshow */ if ( (Log = fopen( Lognam, "a" )) == NULL )    /* document study */
   printf( "Cannot open log file: %s", Lognam );
else
{
   fprintf( Log,
"%9ld,%10ld,%8.6f,%8.6f,%8.6f,%8.6f,%8.5f,%7.4f,%7.4f,%7.4f,%2d,%8.6f,%8.4f\n",
     N, M, r0, r1, r2, r3, r4, r5, r6, r7, Q_maxdepth, r8, r9 );

fclose( Log );
} printf( "%9ld %%%11ld:%7.4f%7.3f%7.3f%7.3f%7.3f%3d%7.4f\n",
   N, M, r0, r4, r5, r6, r7, Q_maxdepth, r8 );

/* Verify that array was sorted correctly
*/
for ( Abuf[1] = I = 0L ; I < N ; ++I, Abuf[1] = Abuf[0] )
{
   Abuf[0] = Buff[ getcache( I ) ].a[ I & CACHEMASK ];

if ( Abuf[1] > Abuf[0] )
      printf( "A[%ld] = %ld  A[%ld] = %ld \n", I-1, Abuf[1], I, Abuf[0] );
} flushcache() ; close( DatFd ) ; fcloseall() ; return( 0 );
}
```

```
static int _fastcall
hello( argc, argv )   /*-----------------------------------------------
                       Parse the command line and setup resources
   --------------*/
   int argc;
   char *argv[];
{  struct cache *cp;

if ( (N = atol( argv[1] )) < 5L )    /* number of array elements */
   {
      printf( "\nN too small, must be 5 or larger\n" ) ; return( 1 );
   } if ( argc < 3 )  M = MAXMODULUS;             /* random range unlimited */ else if ( (M = atol( argv[2] )) > N )    /* modulus limits range */
   {
      printf( "\n Modulus cannot be larger than N\n" ) ; return( 1 );
   }

DatFd = open( Datnam, O_RAW | O_CREAT | O_TRUNC | O_RDWR, S_IWRITE );

if ( DatFd == -1 )
   {
      printf( "\n Cannot open scratchpad file %s\n", Datnam ) ; return( 1 );
   }

Buff = (struct sub_a _huge *) halloc( MAXCACHE, SZ_BUFF );

if ( Buff == NULL )  /* recompile with smaller MAXCACHE value */
   {
      printf( "Halloc( %d, %d ) failed.\n", MAXCACHE, SZ_BUFF ) ;
      return( 1 );
   }

/* Initialize cache elements and Seed random number generator.
    */
   for ( cp = Cache, Head = Tail = 0 ; Tail < MAXCACHE ; ++cp )
   {
      cp->offs = MAXINT32 ; cp->prev = Tail - 1 ; cp->next = ++Tail ;
   }

--Tail ; cp[ -1 ].next = MAXINT8 ;

srand( (short) time( NULL ) ) ; return( 0 );
}

INT8 _fastcall
getcache( idx )   /*-----------------------------------------------------

Return the index of a cache buffer for the given record index
     and, move that cache buffer to the Head of the queue search chain
     if it is not already in the first or second spot to prevent thrashing
     the queue when the twin partition() indexes are in operating in
     different queue buffers.

---------*/   long idx;
{
   INT32 offs = (idx & ~CACHEMASK) << 2 ;    /* SZ_LONG */
```

```
  struct cache *cp;
  INT8 cidx, depth;

/* Search cache for desired record by MRU (most recently used) order
   */
  for( cidx = Head, depth = 0 ; depth < MAXCACHE ; ++depth, cidx = cp->next )
    if ( ( cp = Cache + cidx )->offs == offs )  break;  /* cache HIT */ if ( depth == MAXCACHE )  /* cache MISS; (re)load Tail of cache */
  {
    cidx = Tail;  /* this was the last cache querried above */ if ( cp->offs != MAXINT32 )   /* cache entry is currently used */
    {
      lseek( DatFd, cp->offs, SEEK_SET );   /* save current record */ if ( write( DatFd, (char *) Buff[ cidx ].a, SZ_BUFF ) != SZ_BUFF )
        ++Q_panic;  /* this will terminate the sort shortly */
    } lseek( DatFd, cp->offs = offs, SEEK_SET );  /* load new record */ if ( read( DatFd, (char *) Buff[ cidx ].a, SZ_BUFF ) != SZ_BUFF )
      ++Q_panic;  /* this will terminate the sort shortly too */
  } if ( depth >= 2 )  /* move cache hit to the Head of the queue */
  {
    if ( cp->next == MAXINT8 )   /* current entry was tail */
      Tail = cp->prev;           /* prev entry is now tail */
    else
      Cache[ cp->next ].prev = cp->prev ;  /* bypass entry */

Cache[ cp->prev ].next = cp->next ; cp->prev = MAXINT8 ;

Cache[ cp->next = Head ].prev = cidx ; Head = cidx ;
  } return( cidx );   /* pretty simple, huh?  Wda... */
} static void _fastcall
flushcache() /*-----------------------------------------------------------
                  Write all dirty cache buffers out to disk
  ---------*/
{
  struct cache *cp = Cache;
  INT8 i;
  for ( i = 0 ; i < MAXCACHE ; ++i, ++cp )
  {
    if ( cp->offs != MAXINT32 )      /* if cache record was used */
    {
      lseek( DatFd, cp->offs, SEEK_SET );  /* save current record */ if ( write( DatFd, (char *) Buff[ i ].a, SZ_BUFF ) != SZ_BUFF )
        ++Q_panic;  /* this will terminate the sort shortly */
    }
  } /* closing for all MAXCACHE record buffers */
}
```

```
void _cdecl
errorlog( lvl, fmt, ... )  /*----------------------------------------

This routine replaces Wda's full screen/file error logging function (Note that we still have to support the errorlog.h:errorlog() prototype)

----------*/
    int lvl;
    char *fmt;
{
    char *lead;  va_list args;  va_start( args, fmt );

switch( lvl )  /* print error level leader */
    {
        case WAIT :     lead = " WAIT: "     ; break;
        case NOTE :     lead = " Note: "     ; break;
        case MINOR:     lead = " MINOR: "    ; break;
        case MAJOR:     lead = " MAJOR: "    ; break;
        case CRITICAL:  lead = " CRITICAL: "; break;
        default:        lead = " UNKNOWN: " ;
    } printf( lead ) ; vfprintf( stdout, fmt, args ) ; va_end( args );
    printf( "\n" ) ;
}
```

/*----------------------------------------    -------------------------- Prologue Sorted.c  --  Initialize an array into an already sorted condition.

-------------------------------------------------------------------------*/

```c
#include <stdio.h>              /* std I/O values (Got'ta have it!) */
include <stdlib.h>             /* for rand() and srand()           */ include "wda_defs.h"           /* standard information defines     */
include "wdasort.h"            /* double check Wsort prototype     */ define EXT extern              /* make global declarations external*/
include "wdatest2.h"           /* Global Initialization definitions*/
undef EXT                      /* don't leave EXT define hanging   */ char Datnam[] = "Sorted.dat";   /* Data and Logging file names */
char Lognam[] = "Sorted.log";

int _fastcall
init( N, M )  /*-----------------------------------------------------------
              Here, M is unused;
  ----------*/
  long N, M;
{
  long I, *lptr;
  int i;

/* Initialize array as if already sorted
   */
  for ( I = 0L ; I < N ; /* nop */ )
  {
    lptr = Buff[ getcache( I ) ].a ;

for ( i = 0 ; i < MAXSUB_A ; ++i )
      *lptr++ = I++;
  } return( 0 );
}
```

```
/*------------------------------------   --------------------------- Prologue Reverse.c  --  Initialize an array into a reverse sorted condition.

-----------------------------------------------------------------------*/ include <stdio.h>              /* std I/O values (Got'ta have it!) */
include <stdlib.h>             /* for rand() and srand()           */ include "wda_defs.h"           /* standard information defines     */
include "wdasort.h"            /* double check Wsort prototype     */ define EXT extern              /* make global declarations external*/
include "wdatest2.h"           /* Global Initialization definitions*/
undef EXT                      /* don't leave EXT define hanging   */ char Datnam[] = "Reverse.dat";  /* Data and Logging file names */
char Lognam[] = "Reverse.log";

int _fastcall
init( N, M )  /*-------------------------------------------------------------

Here, M is the number of array entries to randomize

----------*/
   long N, M;
{
   long I, J, *lptr;
   int i;

/* Initialize array as if already sorted
    */
   for ( J = N, I = 0L ; I < N ; I += i )
   {
      lptr = Buff[ getcache( I ) ].a ;

for ( i = 0 ; i < MAXSUB_A ; ++i )
         *lptr++ = J--;
   } return( 0 );
}
```

```
/*--------------------------------        ---------------------------- Prologue Random.c  --  Initialize an array with random numbers limited to
                  modulo M

----------------------------------------------------------------------*/ include <stdio.h>              /* std I/O values (Got'ta have it!) */
include <stdlib.h>             /* for rand() and srand()           */ include "wda_defs.h"           /* standard information defines     */
include "wdasort.h"            /* double check Wsort prototype     */ define EXT extern              /* make global declarations external*/
include "wdatest2.h"           /* Global Initialization definitions*/
undef EXT                      /* don't leave EXT define hanging   */ char Datnam[] = "Random.dat";   /* Data and Logging file names */
char Lognam[] = "Random.log";

int _fastcall
init( N, M )  /*---------------------------------------------------------
                Here, M is the limiting modulus for the random numbers
    ----------*/
    long N, M;
{
    long I, *lptr;
    int i;

for ( I = 0L ; I < N ; I += i )
    {
        lptr = Buff[ getcache( I ) ].a ;

for ( i = 0 ; i < MAXSUB_A ; ++i )
            *lptr++ = randlong( M );
    } return( 0 );
}
```

```c
/*---------------------------------                  --------------------------- Prologue Almost.c  --  Initialize an array into an sorted order and then randomly
                 screw-up M different elements.

-----------------------------------------------------------------------------*/ include <stdio.h>              /* std I/O values (Got'ta have it!) */
include <stdlib.h>             /* for rand() and srand()           */ include "wda_defs.h"           /* standard information defines     */
include "wdasort.h"            /* double check Wsort prototype     */ define EXT extern              /* make global declarations external*/
include "wdatest2.h"           /* Global Initialization definitions*/
undef EXT                      /* don't leave EXT define hanging   */ char Datnam[] = "Almost.dat";   /* Data and Logging file names */
char Lognam[] = "Almost.log";

int _fastcall
init( N, M )  /*---------------------------------------------------------
                 Here, M is the number of array entries to randomize
   ----------*/
   long N, M;
{
   long I, *lptr;
   int i;

/* Initialize array as if already sorted
    */
   for ( I = 0L ; I < N ; /* nop */ )
   {
      lptr = Buff[ getcache( I ) ].a ;

for ( i = 0 ; i < MAXSUB_A ; ++i )
         *lptr++ = I++;
   }

/* Jumble up a given number of elements at random
    */
   while ( M-- )
   {
      I = randlong( N );   /* array index to jumble up */

Buff[ getcache( I ) ].a[ I & CACHEMASK ] = randlong( N );
   } return( 0 );
}
```

```c
/*---------------------------------    --------------------------- Prologue Merge.c  --  Init array into M equal sized blocks of sorted elements.

-------------------------------------------------------------------------*/ include <stdio.h>              /* std I/O values (Got'ta have it!) */
include <stdlib.h>             /* for rand() and srand()           */ include "wda_defs.h"           /* standard information defines     */
include "wdasort.h"            /* double check Wsort prototype     */ define EXT extern              /* make global declarations external*/
include "wdatest2.h"           /* Global Initialization definitions*/
undef EXT                      /* don't leave EXT define hanging   */ char Datnam[] = "Merge.dat";    /* Data and Logging file names */
char Lognam[] = "Merge.log";

int _fastcall
init( N, M )   /*-----------------------------------------------------
                    Here, M is the number of equal sized blocks to make
    ----------*/
    long N, M;
{
    long I, J, *lptr;

for ( I = 0L ; I < N ; I += J )
    {
        lptr = Buff[ getcache( I ) ].a ;

for ( J = 0 ; J < MAXSUB_A && I + J < N ; ++J )
            *lptr++ = randlong( MAXMODULUS );
    }

Q_panic = 0;   /* don't panic, just a new file */

Q_dotrig = MAXMODULUS;   /* don't show dots either */

J = N / M ;     /* size of individual sub-arrays */ for ( I = 0L ; I < N ; I += J )   /* for merge sort test */
    {
        if ( I + J > N - J ) J = N - I ;   /* last sub-array */ if ( Wsort( I, I + J - 1L, loadbuf, savebuf, compbuf ))
            puts( " - Panic! -" );
    } return( 0 );
}
```

```c
/*---------------------------------     ---------------------------- Prologue Organ.c  --  Inititialize array into a pipe organ (123321) type sequence

---------------------------------------------------------------------------*/ include <stdio.h>              /* std I/O values (Got'ta have it!) */
include <stdlib.h>             /* for rand() and srand()           */ include "wda_defs.h"           /* standard information defines     */
include "wdasort.h"            /* double check Wsort prototype     */ define EXT extern              /* make global declarations external*/
include "wdatest2.h"           /* Global Initialization definitions*/
undef EXT                      /* don't leave EXT define hanging   */ char Datnam[] = "Organ.dat";    /* Data and Logging file names */
char Lognam[] = "Organ.log";

int _fastcall
init( N, M )  /*-----------------------------------------------------------
                  Here, M is overwritten with the array midpoint
  ----------*/
  long N, M;
{
  long I, J;

M = N / 2;    /* center of array */ for ( I = 0L ; I < M ; ++I )
    Buff[ getcache( I ) ].a[ I & CACHEMASK ] = I;

for ( J = --I ; J >= 0L ; --J , ++I )
    Buff[ getcache( I ) ].a[ I & CACHEMASK ] = J;

return( 0 );
}
```

```
/*----------------------------------     -------------------------- Prologue Wda_Defs.h - standard #defines for unsigned INT's

---------------*/ typedef unsigned int    INT;    /* Note: all are unsigned */
typedef unsigned char   INT8;
typedef unsigned short  INT16;
typedef unsigned long   INT32;

#define MAXINT8  (INT8) 0xFF
#define MAXINT16 (INT16) 0xFFFF
define MAXINT32 (INT32) 0xFFFFFFFF /*-------------------------------------------------------------------- Prologue WdaSort.h  --  Defines for WdaSort.c...

Note that the caller must provide three record buffers;

buf0 will be used to hold the "left" partition record
      buf1 will be used to hold the partition value record
      buf2 will be used to hold the "right" partition record The comparison function will usually be called to compare
      either the "left" or "right" record to the partition value.
      But the comparison function must be capable of comparing
      any two given indexes.

Note that only the INDEXES of these buffers are passed to
      the comparison routine NOT the pointers themselves like in
      some other implementations.

Also, the comparison routine must ONLY return -1, 0, 1.

If the caller is sorting a complete FILE, use 0L for fridx
      and filelength( fd ) / Reclen - 1L for toidx

----------------------------------------------------------------------*/ define MAXMODULUS  0x40000000L   /* maximum modulus */ extern long _fastcall randlong( INT32 modulus );

extern int _cdecl Wsort( long fridx, long toidx,
   void (_fastcall * loadrec)( long idx, INT8 bufidx ),
   void (_fastcall * saverec)( long idx, INT8 bufidx ),
   int  (_fastcall * comprec)( INT8 aidx, INT8 bidx ) );

extern INT8 Q_maxdepth, Q_panic;   /* miscellaneous housekeeping */
extern INT32 Q_parts, Q_reparts, Q_part3, Q_part2;  /* for study */
/*-------------------------------------------------------------- Prologue Wdatest2.h  --  Global def's for the various initialization routines.

----------------------------------------------------------------------*/ define MAXCACHE  100     /* number of cache entries in Buff */
define MAXSUB_A  1024    /* number of elements in each cache */ struct sub_a
```

```
{
  long a[ MAXSUB_A ];       /* a full 4K cluster stored in here   */
};

EXT struct sub_a _huge *Buff;

#define SZ_LONG  sizeof( long )
#define SZ_BUFF  sizeof( struct sub_a )

#define CACHEMASK 0x3ffL    /* bottom 10 out of 32 bits */

EXT long Q_dotrig;          /* dot show trigger value */ extern int  _fastcall init( long N, long M );
extern INT8 _fastcall getcache( long idx );
extern void _fastcall loadbuf( long idx, INT8 bufidx );
extern void _fastcall savebuf( long idx, INT8 bufidx );
extern int  _fastcall compbuf( INT8 aidx, INT8 bidx );

/*---------------------------------------------------------------- Prologue

Errorlog.h  --  #defines for the errorlog routine

Especially note that there is no prototype for errorlog() since
   it operates like printf() does.  Be very careful with it.

----------*/ define CRITICAL  3           /* CRITICAL error level - panic!      */
define   MAJOR   2           /*  MAJOR   error level - hard fix    */
#define   MINOR   1           /*  MINOR   error level - easy fix    */
#define   NOTE    0           /*  informational message level       */
#define   WAIT   -1           /*  Show WAIT: .... message           */
#define   CANCEL -2           /*  Cancel WAIT:... message           */
define   CLEAR  -3           /*  clear area and position cursor    */ extern void _cdecl errorlog( int lvl, char *fmt, ... );
```

MicroSoft C (version 6.1) Compiler Makefile

```
# Variable Definition

CFLAGS  = /AL /Zp

Re-Define inference rules so that we know what they compromise

.c.obj:
                                        cl $(CFLAGS) -c $<

.obj.exe:
                                        link /st:0x1400 $*+wdatest2+wdasort;

"make" is equivalent to "make all"

all: lastmake organ.exe sorted.exe reverse.exe random.exe almost.exe merge.exe lastmake: wdasort.h wdatest2.h wda_defs.h errorlog.h
                                        touch lastmake
                                        rm *.obj *.exe clean:
                                        rm *.obj *.exe organ.exe: organ.obj wdatest2.obj wdasort.obj sorted.exe: sorted.obj wdatest2.obj wdasort.obj reverse.exe: reverse.obj wdatest2.obj wdasort.obj random.exe: random.obj wdatest2.obj wdasort.obj almost.exe: almost.obj wdatest2.obj wdasort.obj merge.exe: merge.obj wdatest2.obj wdasort.obj
```

MicroSoft DOS Environment Variables used by Compiler

```
CL=/nologo /G2s /Oxz
LINK=/nologo /noi /e /f /packc

INCLUDE=F:\Lang\Micro-c6\Include
HELPFILES=F:\Lang\MS-help\*.hlp
INIT=F:\Lang\Micro-c6\Init
LIB=F:\Lang\Micro-c6\Lib
```

What is claimed is:

1. An improved quicksort method for sorting arrays of values, wherein the method comprises the steps of:

a. selecting an element of the array to serve as a pvalue,
   b. positioning the pvalue element of the array in its final sorted position within the array such that all array values on a first side of the final pvalue array position are less than or equal to the final pvalue array position and all array values on a second side of the final pvalue array position are greater than or equal to the pvalue, and wherein the step of positioning the pvalue element of the array in its final sorted position comprises the steps of:
      1. providing a first index representing the first position of the array,
      2. providing a second index representing the last position of the array,
      3. incrementing the first index until the array element represented by the first index is greater than the pvalue,
      4. decrementing the second index until the array element represented by the second index is less than the pvalue,
      5. after the incrementing and decrementing of the first and second indices of substeps (b)(3) and (b)(4) occurs, swapping the array elements represented by the first and second index, and
      6. repeating substeps (b)(3)–(b)(5) until the first index and second index are equal and the pvalue is exchanged, and
   c. recursively repeating steps a. and b. for each subarray comprising the array elements on opposing sides of the ending location of pvalue;

the improvement comprising:
      in substep (b)(3), incrementing the first index only after either: (a) the second index has been decremented since the last time the first index has been incremented, or (b) the array element represented by the second index is greater than the pvalue; and
      in substep (b)(4), decrementing the second index only after either: (a) the first index has been incremented since the last time the second index has been decremented; or (b) the array element represented by the first index is less than the pvalue.

2. An improved quicksort method for sorting arrays of values, wherein the method comprises the steps of:

a. selecting an element of the array to serve as a pvalue,
   b. positioning the pvalue element of the array in its final sorted position within the array such that all array values on a first side of the final pvalue array position are less than or equal to the final pvalue array position and all array values on a second side of the final pvalue array position are greater than or equal to the pvalue, and wherein the step of positioning the pvalue element of the array in its final sorted order comprises the steps of:
      1. providing a first index representing the first position of the array,
      2. providing a second index representing the last position of the array,
      3. incrementing the first index until the array element represented by the first index is greater than the pvalue,
      4. decrementing the second index until the array element represented by the second index is less than the pvalue,
      5. after the incrementing and decrementing of the first and second indices of substeps (b)(4) and (b)(5) occurs, swapping the array elements represented by the first and second index, and
      6. repeating substeps (b)(4)–(b)(5) until the first index and second index are equal and the pvalue is exchanged, and
   c. recursively repeating steps a. and b. for each subarray comprising the array elements on opposing sides of the pvalue;

the improvement comprising:
      when the incrementing of the first index has been suspended because the array element represented by the first index is greater than the pvalue in substep (b)(3), in substep (b)(4), continuing to decrement the second index until the array element represented by the second index is less than or equal to the pvalue; and
      when the decrementing of the second index has been suspended because the array element represented by the second index is less than the pvalue in substep (b)(4), in substep (b)(3), continuing to increment the first index until the array element represented by the first index is greater than or equal to the pvalue.

3. An improved quicksort method for sorting arrays of values, wherein the method comprises the steps of:

a. selecting an element of the array to serve as a pvalue,
   b. positioning the pvalue element of the array in its final sorted position within the array such that all array values on a first side of the final pvalue array position are less than or equal to the final pvalue array position and all array values on a second side of the final pvalue array position are greater than or equal to the pvalue, and wherein the step of positioning the pvalue element of the array in its final sorted order comprises the steps of:
      1. providing a first index representing the first position of the array,
      2. providing a second index representing the last position of the array,
      3. incrementing the first index until the array element represented by the first index is greater than the pvalue,
      4. decrementing the second index until the array element represented by the second index is less than the pvalue,
      5. after the incrementing and decrementing of the first and second indices of substeps (b)(4) and (b)(5) occurs, swapping the array elements represented by the first and second index, and
      6. repeating substeps (b)(4)–(b)(5) until the first index and second index are equal and the pvalue is exchanged, and
   c. recursively repeating steps a. and b. for each subarray comprising the array elements on opposing sides of the pvalue;

the improvement comprising:
      d. specifying a number representing a portion of the number of elements in the array or subarray to be sorted, said number comprising from 70% to 95% of the total number of elements in the array,
      e. after the first instance of step b. but before step c, determining whether the final position of the pvalue is within the centermost range of array elements represented by the number specified in step d., and
      f. if the final position of the pvalue is outside a centermost range of array element pursuant to step e., selecting a different pvalue from the array and repeating step b. a single time at the current recursion level.

4. The method of claim 3 wherein the number of element selected in step d. represents from 90% to 95% of the total number of elements in the array or subarray.

5. The method of claim 3 wherein in step f, the new pvalue is selected at random from the array or subarray to be sorted.

6. The method of claim 3 wherein in step f, the new pvalue is selected from the array on the side of the pvalue having the greater number of array elements.

7. An improved quicksort method for sorting arrays of values, wherein the method comprises the steps of:

a. selecting an element of the array to serve as a pvalue,
   b. positioning the pvalue element of the array in its final sorted position within the array such that all array values on a first side of the final pvalue array position are less than or equal to the final pvalue array position and all array values on a second side of the final pvalue array position are greater than or equal to the pvalue, and wherein the step of positioning the pvalue element of the array in its final sorted order comprises the steps of:
      1. providing a first index representing the first position of the array,
      2. providing a second index representing the last position of the array,
      3. incrementing the first index until the array element represented by the first index is greater than the pvalue,
      4. decrementing the second index until the array element represented by the second index is less than the pvalue,
      5. after the incrementing and decrementing of the first and second indices of substeps (b)(4) and (b)(5) occurs, swapping the array elements represented by the first and second index, and
      6. repeating substeps (b)(4)–(b)(5) until the first index and second index are equal and the pvalue is exchanged, and
   c. recursively repeating steps a. and b. for each subarray comprising the array elements on opposing sides of the pvalue;

the improvement comprising:

d. specifying a number representing a maximum number of recursions for step c, and
   e. counting the number of recursion levels pursuant to step c, and
   f. in performing steps a or b, comparing the current recursion level count to the maximum number of recursions, and the if the current recursion count is equal to or exceeds the maximum number of recursions, returning to the topmost recursion level, and selecting a different pvalue from the array, and restarting the process.

8. The method of claim 7 further comprising the step of:

after returning to the topmost recursion level pursuant to step f performing the steps of:

g. specifying a number representing a portion of the number of elements in the array or subarray to be sorted, said number comprising from 70% to 80% of the total number of elements in the array,
   h. after the first instance of step b. but before step c, determining whether the final position of the pvalue is within the centermost range of array elements represented by the number specified in step d., and
   i. if the final position of the pvalue is outside the centermost range of array element pursuant to step h., selecting a different pvalue from the array and repeating step b. a single time at the current recursion level.

9. The method of claim 8 wherein in step f, the new pvalue is selected from the subarray on the side of the pvalue having the greater number of array elements.

* * * * *